(12) United States Patent
Badding et al.

(10) Patent No.: US 11,577,427 B2
(45) Date of Patent: *Feb. 14, 2023

(54) MANUFACTURING SYSTEM, PROCESS, ARTICLE, AND FURNACE

(71) Applicant: CORNING INCORPORATED, Corning, NY (US)

(72) Inventors: Michael Edward Badding, Campbell, NY (US); William Joseph Bouton, Big Flats, NY (US); Lanrik Wayne Kester, Savona, NY (US); Thomas Dale Ketcham, Horseheads, NY (US); Andrew Peter Kittleson, Honeoye Falls, NY (US); Dale Charles Marshall, Brockport, NY (US); Gary Edward Merz, Rochester, NY (US); Eric Lee Miller, Corning, NY (US); Emmanuel Chima Okpara, Painted Post, NY (US); Conor James Walsh, Campbell, NY (US)

(73) Assignee: Corning Incorporated, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,072

(22) Filed: May 6, 2022

(65) Prior Publication Data

US 2022/0297344 A1 Sep. 22, 2022

Related U.S. Application Data

(63) Continuation of application No. 16/591,058, filed on Oct. 2, 2019, now Pat. No. 11,351,697, which is a
(Continued)

(51) Int. Cl.
*C04B 35/10* (2006.01)
*F27B 9/14* (2006.01)
(Continued)

(52) U.S. Cl.
CPC ............ *B28B 11/243* (2013.01); *B32B 27/32* (2013.01); *C04B 35/115* (2013.01);
(Continued)

(58) Field of Classification Search
CPC ....... C04B 35/10; C04B 35/115; B28B 11/24; B28B 11/243; B32B 27/32; F27B 9/14; C23D 7/00; C23D 9/00; C23D 9/08
See application file for complete search history.

(56) References Cited

U.S. PATENT DOCUMENTS

| | | | |
|---|---|---|---|
| 1,597,293 A | 8/1926 | Ruff | |
| 2,966,719 A | 1/1961 | Park, Jr. | |
| 3,704,872 A * | 12/1972 | Klein | ..................... B22F 3/003 |
| | | | 432/59 |

(Continued)

FOREIGN PATENT DOCUMENTS

| | | | |
|---|---|---|---|
| CN | 1130608 A | 9/1996 | |
| CN | 2237508 Y | 10/1996 | |

(Continued)

OTHER PUBLICATIONS

"Zirconia—The Royal Society of Chemistry" found at http://media.rsc.org/zinc%20and%20zirconia/zirconia.pdf) available on Jun. 13, 2017.

(Continued)

*Primary Examiner* — Gregory A Wilson
(74) *Attorney, Agent, or Firm* — Russell S. Magaziner

(57) ABSTRACT

A manufacturing system includes a tape advancing through the manufacturing system and a station of the manufacturing system. The tape includes a first portion having grains of an inorganic material bound by an organic binder. The station of the manufacturing system receives the first portion of the tape and prepares the tape for sintering by chemically changing the organic binder and/or removing the organic
(Continued)

binder from the first portion of the tape, leaving the grains of the inorganic material, to form a second portion of the tape and, at least in part, prepare the tape for sintering.

35 Claims, 25 Drawing Sheets

Related U.S. Application Data continuation of application No. 15/847,310, filed on Dec. 19, 2017, now Pat. No. 10,486,332, which is a continuation-in-part of application No. 15/790,737, filed on Oct. 23, 2017, now abandoned, which is a continuation of application No. 15/218,689, filed on Jul. 25, 2016, now Pat. No. 10,766,165, which is a continuation of application No. PCT/US2016/039708, filed on Jun. 28, 2016.

(60) Provisional application No. 62/437,157, filed on Dec. 21, 2016, provisional application No. 62/185,950, filed on Jun. 29, 2015.

(51) Int. Cl.
B28B 11/24 (2006.01)
C04B 35/115 (2006.01)
C04B 35/638 (2006.01)
C04B 35/486 (2006.01)
C04B 35/64 (2006.01)
B32B 27/32 (2006.01)

(52) U.S. Cl.
CPC .......... C04B 35/486 (2013.01); C04B 35/638 (2013.01); C04B 35/64 (2013.01); C04B 2235/3225 (2013.01); C04B 2235/6025 (2013.01); C04B 2235/612 (2013.01); C04B 2235/65 (2013.01); C04B 2235/656 (2013.01); C04B 2235/9615 (2013.01)

(56) References Cited

U.S. PATENT DOCUMENTS

| | | | |
|---|---|---|---|
| 3,837,891 A * | 9/1974 | Tietz | C04B 41/81 |
| | | | 428/401 |
| 3,988,405 A | 10/1976 | Smith et al. | |
| 4,045,412 A | 8/1977 | Yamada et al. | |
| 4,488,870 A | 12/1984 | Scrantom et al. | |
| 4,511,328 A * | 4/1985 | Ramge | C03B 37/15 |
| | | | 432/186 |
| 4,731,207 A | 3/1988 | Matsumoto et al. | |
| 5,064,588 A | 11/1991 | Misawa | |
| 5,064,596 A | 11/1991 | Chida et al. | |
| 5,089,455 A | 2/1992 | Ketcham et al. | |
| 5,393,571 A | 2/1995 | Suga et al. | |
| 5,514,313 A | 5/1996 | Yoshida | |
| 5,579,532 A | 11/1996 | Edd | |
| 5,814,262 A | 9/1998 | Ketcham et al. | |
| 5,961,917 A | 10/1999 | Hattori | |
| 6,001,761 A | 12/1999 | Hata et al. | |
| 6,346,317 B1 | 2/2002 | Ritland et al. | |
| 6,447,712 B1 | 9/2002 | Dogan et al. | |
| 6,530,780 B2 | 3/2003 | Mori et al. | |
| 7,470,390 B2 * | 12/2008 | Nakamura | C04B 35/6303 |
| | | | 264/672 |
| 7,550,319 B2 | 6/2009 | Wang et al. | |
| 8,359,884 B2 | 1/2013 | Hawtof | |
| 8,894,920 B2 | 11/2014 | Kester et al. | |
| 9,718,993 B2 | 8/2017 | Thorstensen et al. | |
| 9,878,934 B2 | 1/2018 | Shi et al. | |
| 9,919,481 B2 * | 3/2018 | Nelson | B32B 5/12 |
| 10,103,405 B2 | 10/2018 | Choi et al. | |
| 10,155,667 B2 * | 12/2018 | Badding | C04B 35/632 |
| 10,967,539 B2 | 4/2021 | Badding et al. | |
| 2003/0119656 A1 | 6/2003 | Chiu et al. | |
| 2006/0027951 A1 | 2/2006 | Peterson | |
| 2006/0228555 A1 | 10/2006 | Hata et al. | |
| 2006/0228855 A1 | 10/2006 | Min et al. | |
| 2009/0029307 A1 | 1/2009 | Ohara | |
| 2010/0043495 A1 | 2/2010 | Kirby et al. | |
| 2010/0314646 A1 | 12/2010 | Breen et al. | |
| 2011/0198785 A1 | 8/2011 | Kester et al. | |
| 2011/0232330 A1 | 9/2011 | Noni, Jr. | |
| 2013/0316136 A1 | 11/2013 | Hawtof et al. | |
| 2014/0079620 A1 | 3/2014 | Panz et al. | |
| 2014/0299902 A1 | 10/2014 | Zimmerman et al. | |
| 2015/0044364 A1 | 2/2015 | Ohta et al. | |
| 2015/0099188 A1 | 4/2015 | Holme et al. | |
| 2015/0253526 A1 | 9/2015 | Sandate et al. | |
| 2016/0375607 A1 | 12/2016 | Badding et al. | |
| 2017/0062873 A1 | 3/2017 | Iyer et al. | |
| 2017/0210634 A1 | 7/2017 | Badding et al. | |
| 2017/0263976 A1 | 9/2017 | Choi et al. | |
| 2019/0260073 A1 | 8/2019 | Chao et al. | |

FOREIGN PATENT DOCUMENTS

| | | |
|---|---|---|
| CN | 1141271 A | 1/1997 |
| CN | 1286729 A | 3/2001 |
| CN | 1293437 A | 5/2001 |
| CN | 1346960 A | 5/2002 |
| CN | 1458913 A | 11/2003 |
| CN | 1643169 A | 7/2005 |
| CN | 1702057 A | 11/2005 |
| CN | 1816937 A | 8/2006 |
| CN | 1925182 A | 3/2007 |
| CN | 1993300 A | 7/2007 |
| CN | 101186488 A | 5/2008 |
| CN | 101213156 A | 7/2008 |
| CN | 101269977 A | 9/2008 |
| CN | 101311141 A | 11/2008 |
| CN | 101389914 A | 3/2009 |
| CN | 102093038 A | 6/2011 |
| CN | 102101777 A | 6/2011 |
| CN | 102161261 A | 8/2011 |
| CN | 102203030 A | 9/2011 |
| CN | 102254831 A | 11/2011 |
| CN | 102554249 A | 7/2012 |
| CN | 103896595 A | 7/2014 |
| CN | 203728729 U | 7/2014 |
| CN | 203863801 U | 10/2014 |
| CN | 104220221 A | 12/2014 |
| CN | 104478436 A | 4/2015 |
| CN | 106077658 A | 11/2016 |
| EP | 0858983 A2 | 8/1998 |
| JP | 01-203275 A | 8/1989 |
| JP | 03-197367 A | 8/1991 |
| JP | 03-208176 A | 9/1991 |
| JP | 06-024784 A | 2/1994 |
| JP | 06-191930 A | 7/1994 |
| JP | 08-151270 A | 6/1996 |
| JP | 2000-094429 A | 4/2000 |
| JP | 3028176 B2 | 4/2000 |
| JP | 2000-210922 A | 8/2000 |
| JP | 2001-031476 A | 2/2001 |
| JP | 2002-036227 A | 2/2002 |
| JP | 2003-328006 A | 11/2003 |
| JP | 2004-043197 A | 2/2004 |
| JP | 2005-191309 A | 7/2005 |
| JP | 2010-064255 A | 3/2010 |
| JP | 2012-507420 A | 3/2012 |
| JP | 2013-053353 A | 3/2013 |
| TW | 201350320 A | 12/2013 |
| WO | 2007/108417 A1 | 9/2007 |
| WO | 2010/051345 A2 | 5/2010 |
| WO | 2011/008911 A1 | 1/2011 |

OTHER PUBLICATIONS

Cekic-Nagas et al; "Comparison of Light Transmittance in Different Thicknesses of Zirconia Under Various Light Curing Units"; The

(56) References Cited

OTHER PUBLICATIONS

Journal of Advanced Prosthodontics; May 4, 2012; pp. 93-96; Published On-Line May 30, 2012.
Cologna et al. "Vertical sintering to measure the uniaxial viscosity of thin ceramic layers"; Acta Materialia 58 (2010); pp. 5558-5564.
Comparison of Light Transmittance in Different Thicknesses of Zirconia Under Various Light Curing Units; Isil Cekic-Nagas, DDS, PhD, Fernhan Egilmez, DDS, PhD and Gulfem Ergun, DDS PhD; The Journal of Advanced Prosthodontics; May 4, 2012; pp. 93-96; Published on-line May 30, 2012.
Fu et al. "Fabrication and Evaluation of Ni—GdC Composite Anode Prepared by Aqueous-based Tape Casting Method for Low-Temperature Solid Oxide Fuel Cell"; International Journal of Hydrogen Energy; 35 (2010) 301-307.
Kim et al. "Constrained Sintering of SOFC Electrolytes"; Imperial College London (Retrieved Jun. 26, 2016), https://www3.imperial.ac.uk/pls/protallive/docs/1/47045709.pdf, 7 pages.
Olenick; "R2R Ultrathin Flexible Ceramic for Cost Effective Coating"; ENrG Inc. (Feb. 18, 2015); http://www.enrg-inc.com/documents/Website%20Version%20R2R.pdf; pp. 1-7.
Thorel "Tape Casting Ceramics for high temperature Fuel Cell applications"; Ceramic Materials, Wilfried Wunderlich (Ed.) Retrieved Jun. 23, 2016; http://www.intechopen.com/books/ceramic-materials/tape-casting-ceramics-for-high-temperature-fuel-cell-applications; 7 pages.
Wang et al. "Two-Step Sintering of Ceramics with Constant Grain-Size, I. Y2O3"; J. Am. Ceram. Soc. 89 [2] (2006); pp. 431-437.

\* cited by examiner

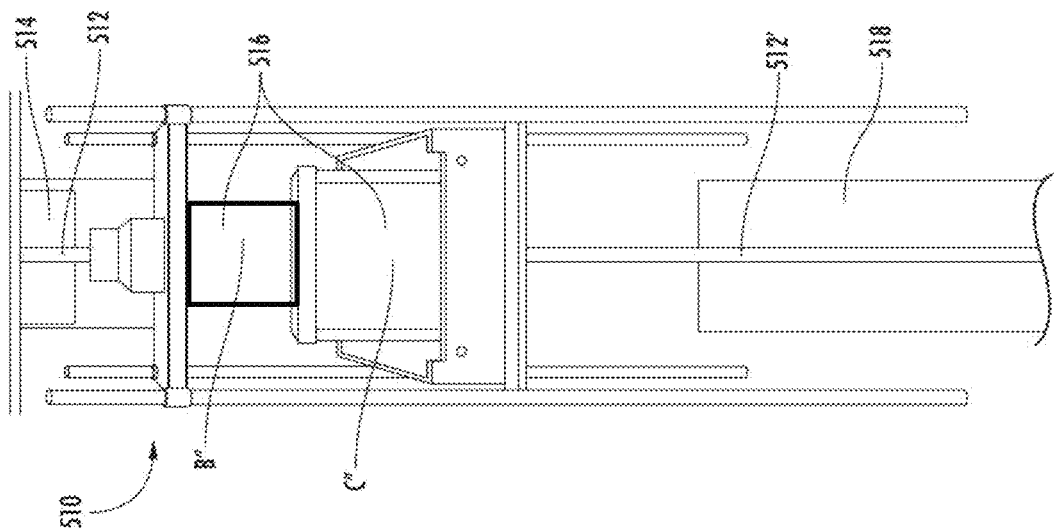

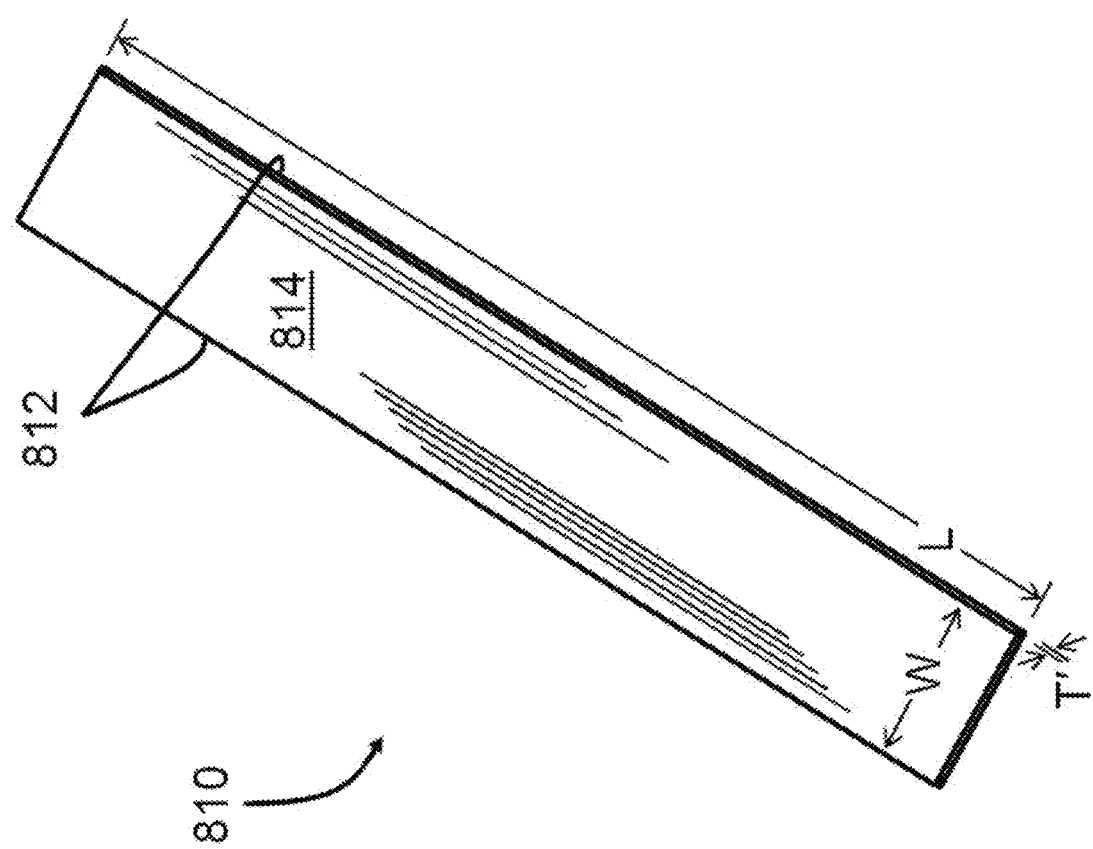

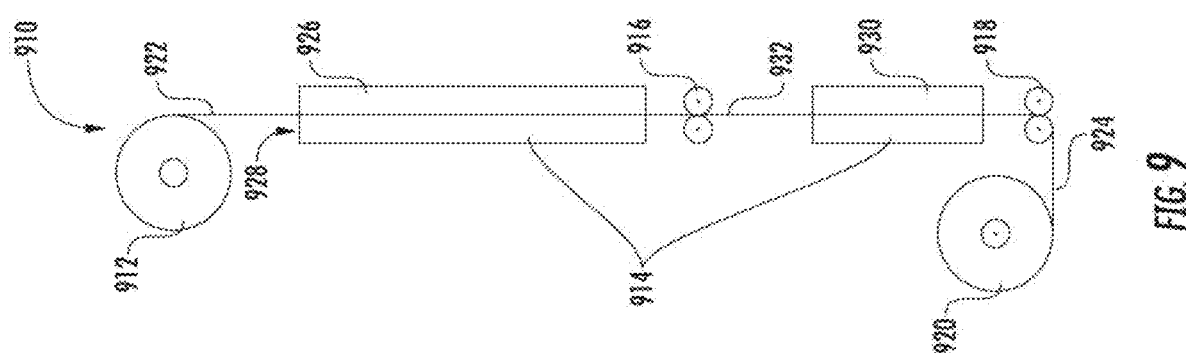

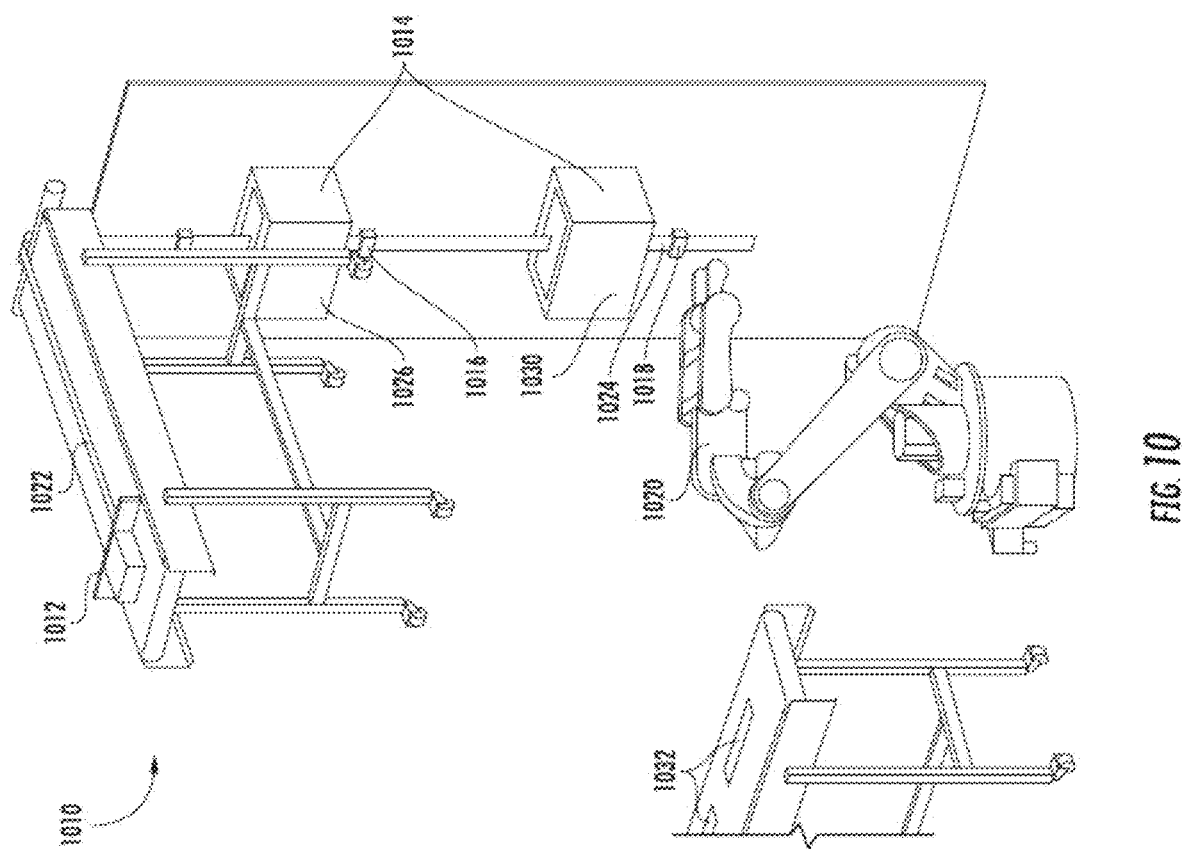

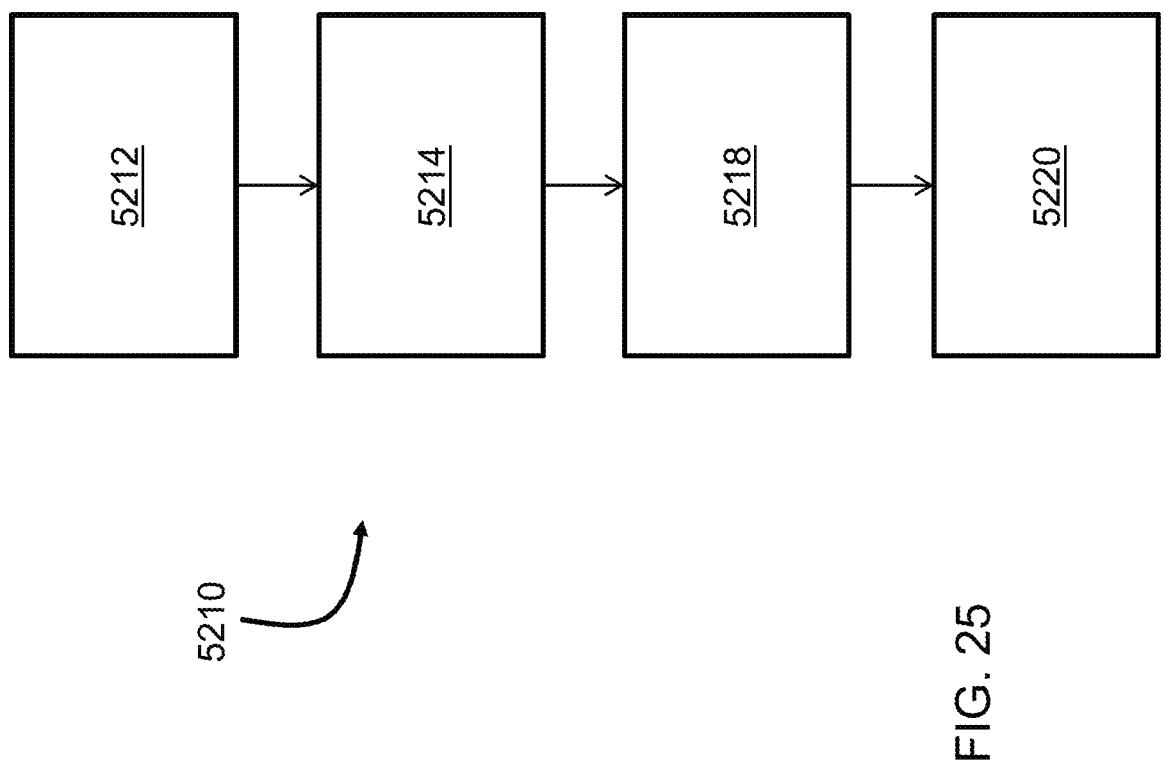

MANUFACTURING SYSTEM, PROCESS, ARTICLE, AND FURNACE

This application is a continuation of U.S. application Ser. No. 16/591,058 filed on Oct. 2, 2019, which is a continuation of U.S. application Ser. No. 15/847,310 filed on Dec. 19, 2017, which issued on Nov. 26, 2019 as U.S. Pat. No. 10,486,332, which claims the benefit of priority of U.S. Provisional Application No. 62/437,157 filed Dec. 21, 2016 and is a continuation-in-part of U.S. application Ser. No. 15/790,737 filed Oct. 23, 2017, which is a continuation of U.S. application Ser. No. 15/218,689 filed Jul. 25, 2016 which issued on Sep. 8, 2020 as U.S. Pat. No. 10,766,165, which is a continuation of International Application No. PCT/US16/39708 filed Jun. 28, 2016, which claims the benefit of priority of U.S. Provisional Application No. 62/185,950 filed Jun. 29, 2015, each of which is relied upon and incorporated herein by reference in its entirety.

Aspects of the present disclosure generally relate to processes for sintering green tape, such as green tape including inorganic grains, such as polycrystalline ceramic grains, bound in an organic binder.

Articles, such as thin sheets, tapes, or ribbons of ceramic have many potential uses, such as serving as waveguides when the ceramic is transmissive to light, serving as substrates that may be coated or laminated and integrated in batteries and other components, or other applications. Such articles may be manufactured by forming large ingots of the sintered material, cutting slivers or plates of the material, and polishing the corresponding articles to a desired form and surface quality. Polishing helps to remove flaws or defects on the surfaces of the articles, but is time- and resource-consuming.

Thin sheets may also be made by sintering of tape cast articles, where loose ceramic particles are held together by a polymer binder to form green sheets. The binder provides strength and cohesion to the particles, and the green sheets may be handled for further processing. The green sheets may be placed on a setter or setter board to support the ceramic particles as the binder material is burned off of the green sheets in an oven. At sufficient temperature in the oven, the particles then sinter together to produce the thin sheets. However, such a process may be low yield, energy- and time-consuming. Further the setter may interact with the particles during sintering, as the sheet contracts, causing defects such as pinholes due to adhesion to refractory materials in the setter. Such defects may be particularly prevalent in thin ceramic sheets. See for example sheets 110, 210 and defects 112, 212 of FIGS. 1-2.

A need exists for equipment and manufacturing processes for making articles, such as tapes and sheets of polycrystalline ceramics, metals, or other materials that may be sintered, where the articles may be efficiently manufactured. Such articles may be useful as substrates such as in batteries, on printed circuit boards, as cover sheets for displays, such for handheld devices, or the articles may be otherwise useful.

SUMMARY

Applicants have developed a process of continuously processing green tape including inorganic grains, such as polycrystalline ceramic grains, bound in an organic binder. As part of the process, Applicants have discovered it is useful to first burn-off or otherwise change or remove the organic binder, prior to sintering the inorganic grains to produce a sintered article. Removing the binder first allows the grains to subsequently sintered without adjoining binder material combusting or otherwise interfering with the sintering process. However, without the organic binder, one might expect the inorganic grains may be unsupported and lacking sufficient strength for handling and further processing in the continuous manufacturing of the tape.

Surprisingly, Applicants have discovered, following removing and/or chemically changing the binder prior to sintering, that the tape actually maintains sufficient strength for further processing. While Applicants have found that slight vibrations or perturbations of the tape following the binder removal causes the tape to fracture and fail in bending, the tape is stronger axially. Interaction of the grains with themselves and possibly some remnants of the organic binder, provides sufficient strength to the tape to allow for pulling of the tape through a specially designed furnace, to at least partially sinter the tape, allowing for continuous processing.

Some aspects of the present technology relate to a manufacturing system that includes a tape advancing through the manufacturing system and a station of the manufacturing system. The tape includes a first portion having grains of an inorganic material bound by an organic binder. The station of the manufacturing system receives the first portion of the tape and prepares the tape for sintering by chemically changing the organic binder and/or removing the organic binder from the first portion of the tape, leaving the grains of the inorganic material, to form a second portion of the tape and prepare the tape for sintering.

Other aspects of the present technology relate to a furnace that includes walls defining a passage having inlet and outlet openings on opposing ends of the passage. The passage has a length between the inlet and outlet openings of at least 5 cm. The outlet opening is narrow and elongate, having a height and a width that is orthogonal to the height, where the height is less than a fifth of the width, and where the height is less than 2 cm. The furnace further includes a heater that actively provides heat energy to the passage, where the heater reaches temperatures of at least 200° C.

Still other aspects of the present technology relate to a method of processing tape. The method includes a step of advancing tape through a manufacturing system, where the tape includes a first portion having grains of an inorganic material bound by an organic binder. The method further includes preparing the tape for sintering by forming a second portion of the tape at a station of the manufacturing system by chemically changing the organic binder and/or removing the organic binder from the first portion of the tape, leaving the grains of the inorganic material.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which:

FIG. 5 is a schematic diagram of a manufacturing line according to an exemplary embodiment with tape being processed.

FIG. 8 is a perspective view of a sintered article in the form of a thin sintered tape of material, according to an exemplary embodiment.

FIG. 9 is a schematic diagram from a side view of a manufacturing line according to another exemplary embodiment.

FIGS. 10-11 are perspective views of manufacturing lines according to other exemplary embodiments.

FIG. 25 is a block diagram of a method for processing a green tape to at least in part prepare the green tape for sintering according to an exemplary embodiment

DETAILED DESCRIPTION

Figure 1:
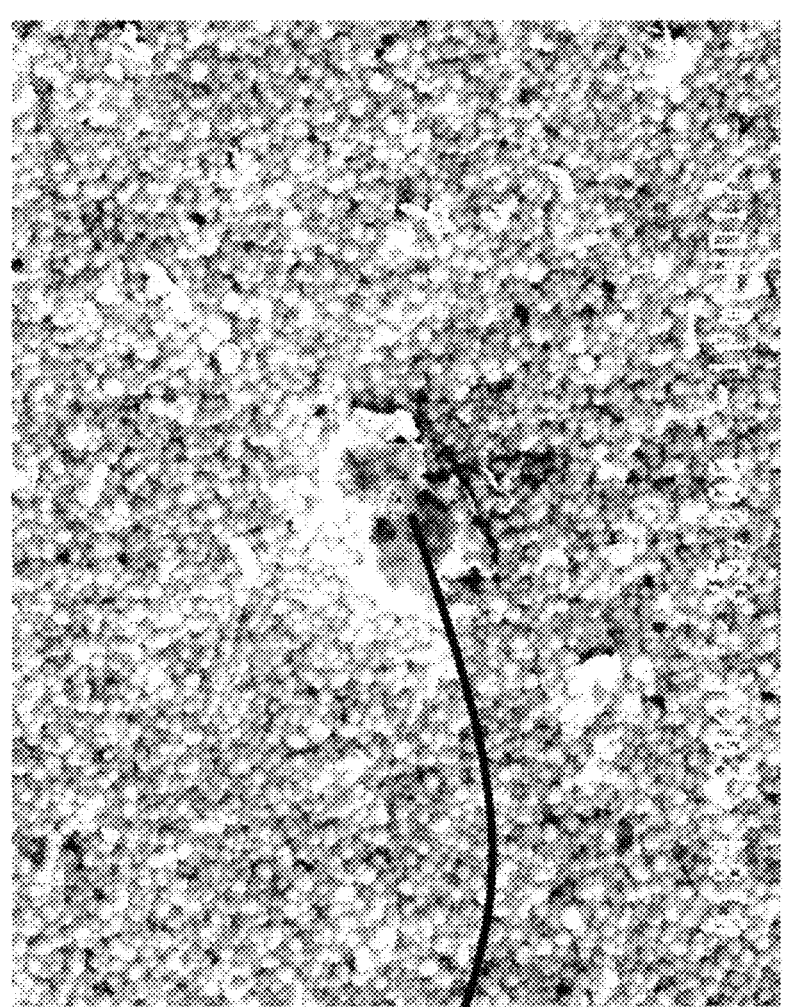
FIGS. 1 and 2 are digital images of ceramic material with surface defects.

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

Referring to FIGS. 3A-3B, a manufacturing line 310 includes a furnace system 312 and a workpiece (e.g., ribbon, tape, web, line, material), such as a tape 314, shown from a side view, extending into the furnace system 312. The tape 314 may be routed around a curve or roller 316 and directed toward the furnace system 312. According to an exemplary embodiment, the furnace system 312 includes a passage 318, which includes a binder burn-off location B and/or a sintering location C for at least partially sintering the tape 314 after the tape has passed the binder burn-off location B. In some embodiments, the binder burn-off location B is adjacent to the sintering location C, such as directly above or below the sintering location C along the manufacturing line 310, such as within 1 meter, within 50 centimeters, within 10 centimeters. As will be discussed further, close placement of the binder burn-off location B and the sintering location C reduces the time/length that the tape 314 is unbound by binder prior to sintering.

Passing the tape 314 through the binder burn-off location B and/or a sintering location C, without contacting the tape 314 with surfaces 320 of the sintering location C and/or surfaces 322 of the binder burn-off location B, is believed to improve the surface quality of the tape 314 as it is processed by the furnace system 312, by reducing material transfer and/or scoring or otherwise shaping of the tape 314 via contact.

According to an exemplary embodiment, a first section of the tape 314 is a green tape section 314A, which may be positioned at a location A along the manufacturing line 310. According to an exemplary embodiment, the green tape section 314A includes polycrystalline ceramic and/or minerals (e.g., alumina, zirconia, lithium garnet, spinel) bound by an organic binder (e.g., polyvinyl butyral, dibutyl phthalate, polyalkyl carbonate, acrylic polymers, polyesters, silicones, etc.). In contemplated embodiments, the green tape section 314A may include metal particles bound in an organic binder. In other contemplated embodiments, the green tape section 314A may include glass grains (e.g., high purity silica grains, borosilicate, aluminosilicate, soda lime) or other inorganic grains bound by an organic binder. In contemplated embodiments, the green tape section 314A may include glass-ceramic particles (e.g. cordierite, LAS lithium aluminosilicates, Nasicon structure lithium metal phosphates, celsian) bound in an organic binder. According to an exemplary embodiment, the green tape section 314A has a porosity of from about 0.01 to about 25 vol % and/or the inorganic particles have a median particle size diameter of from 50 to 1,000 nanometers and a Brunauer, Emmett and Teller (BET) surface area of from 2 to 30 $m^2/g$. In other contemplated embodiments, the above materials may be bound by inorganic binders or other binders and/or the above materials may be otherwise sized or have other porosity.

As the green tape section 314A passes the binder burn-off location B, the furnace system 312 is configured to burn off and/or char, due to oxidation, volatilization, and/or crosslink, binder material from the green tape section 314A, such as most of the binder, such as at least 90% of the binder.

Beyond the binder burn-off location B, the tape 314 is no longer "green" and a second section of the tape 314 is an unbound tape section 314B (e.g., burned-off tape section, charred binder tape section), which may be unsintered, yet may be without binder or with charred binder. Applicants have discovered that the unbound tape section 314B may remain intact, despite the binder being burned off and/or charred, if the tape 314 is properly handled, such as if tension on the tape 314 is controlled and/or if the tape 314 is not bent and/or reoriented prior to at least partial sintering of inorganic material (e.g. ceramic grains) of the tape 314.

Referring still to FIG. 3A, the unbound tape section 314B portion of the tape 314 then passes into and/or by the sintering location C, and the furnace system 312 is configured to at least partially sinter the polycrystalline ceramic or other inorganic material of the unbound tape section 314B. For example, polycrystalline ceramic grains may be sintered such that the grains bond or fuse to one another yet the tape 314 still includes a large amount of porosity (e.g., at least 10% by volume, at least 30% by volume), where the "porosity" refers to the portions of the volume of the tape unoccupied by the inorganic material, such as the polycrystalline ceramic.

Once at least partially sintered, the corresponding section of the tape 314 is an at least partially sintered tape section 314C. Partially and not fully sintering the at least partially sintered tape section 314C may increase the strength of the tape 314 to the extent that tension may be applied to the tape 314 to facilitate subsequent shaping of the tape 314. According to an exemplary embodiment, under tension, additional sintering of the tape 314 occurs to produce a particularly flat or otherwise-shaped sintered article (see generally FIG. 5).

According to an exemplary embodiment, the manufacturing line 310 further includes a tension regulator 324, which influences tension in the tape 314, such as by directly interacting with the at least partially sintered tape section 314C. The tension regulator 324 may control and separate tension in the tape 314 above versus below the tension regulator 324 such that tension may be different in the portions of the tape 314 on either side of the tension regulator 324. In some embodiments, the tension regulator 324 includes an air bearing, where air may be directed with or against a direction that the tape 314 moves through the manufacturing line 310, such as to adjust tension in the tape 314. In other embodiments, the tension regulator 324 includes nip rollers that pull or push the tape 314 to influence tension in the tape 314. In still other embodiments, the tension regulator 324 may be a wheel (see, e.g., FIG. 12), where friction on a surface of the wheel as well as rotation of the wheel influences tension in the tape 314. As discussed, tension in the tape 314 may be used to shape the tape 314 as the tape 314 is sintered, such as at the sintering location C or elsewhere along the manufacturing line 310. Additionally, tension (positive or negative amounts thereof) applied to the tape 314 by the tension regulator 324 may help hold the unbound tape section 314B together, by influencing the tension in that section.

Referring now to FIG. 3B, temperatures of the tape 314 may vary along the length of the tape 314 as a function of position of the particular portion of the tape 314 along the manufacturing line 310. The green tape section 314A, prior to entering the binder burn-off location B may experience a first temperature, such as room temperature (e.g., about 25° C.). Near the binder burn-off location B, the temperature experienced by the unbound tape section 314B of the tape 314 may be greater than that experienced by the green tape section 314A, such as at least 200° C., at least 400° C. Near and at the sintering location C, the temperature experienced by the tape 314 may be greater still than that experienced by the tape 314 near the binder burn-off location B, such as at least 800° C., at least 1000° C. at the sintering location C. Portions of the tape 314 located at a position along the manufacturing line 310 past the sintering location C may then experience a lower temperature than portions of the tape 314 at the sintering location C and/or than portions of the tape 314 at the binder burn-off location B, such as experiencing room temperature.

Figure 4:
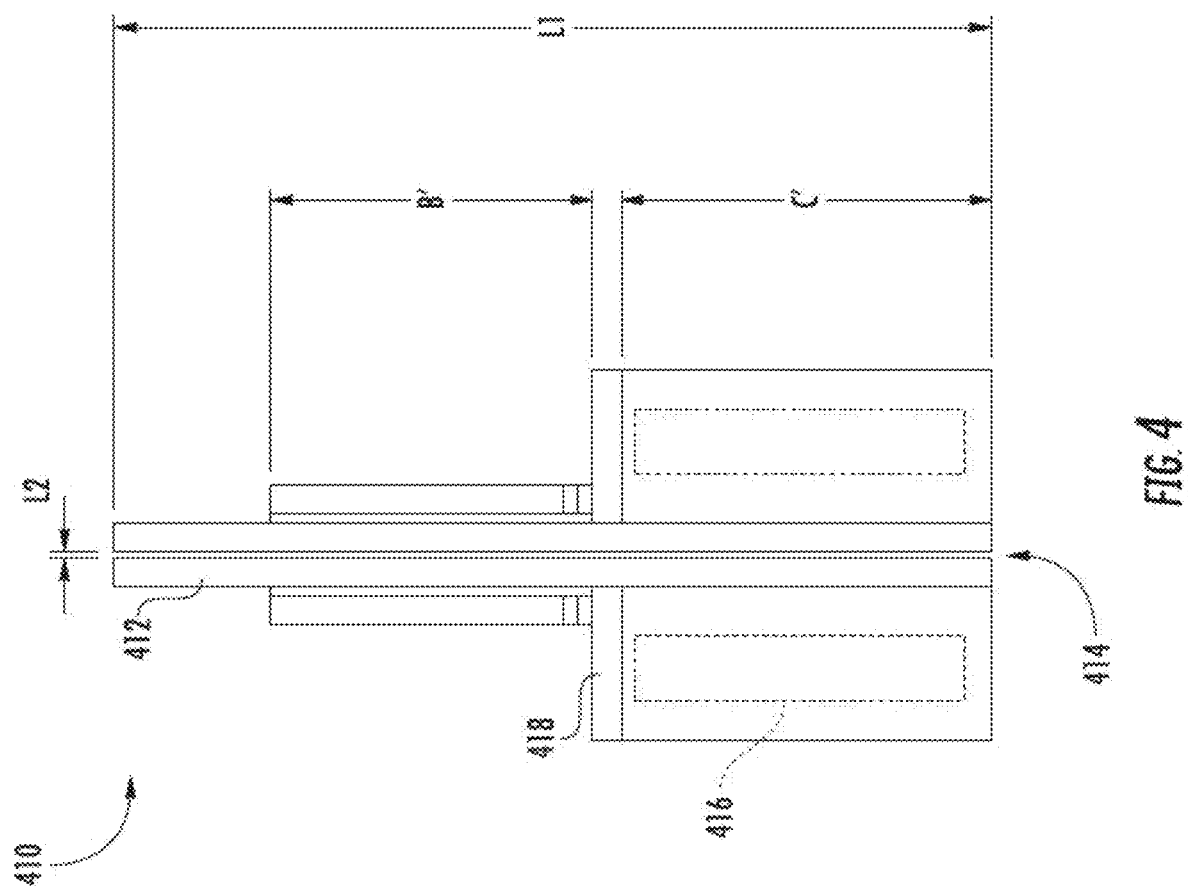
FIG. 4 is a cross-sectional view of a furnace according to an exemplary embodiment.

Referring to FIG. 4, a furnace system 410 includes a guide 412 that defines a passage 414 that extends at least partially through the furnace system 410, such as fully through a depth L1 of the furnace system 410. In some embodiments, the guide 412 may be a tube or shaft, which may be formed from refractory materials. In some applications of the furnace system 410, the workpiece may be narrower than the passage 414 and may be positioned within the passage 414 so as to not contact surfaces of the guide 412. The furnace system 410 may be used in a manufacturing line, such as the manufacturing line 310.

According to an exemplary embodiment, the passage 414 of the furnace system 410 has depth dimension L1 that extends through the furnace system 410, a width dimension (extending into and out of the FIG. 4) orthogonal to the depth dimension L1, and a gap dimension L2 that is orthogonal to both the depth dimension L1 and the width dimension. According to an exemplary embodiment, the depth dimension L1 of the passage 414 is greater than the width dimension, and the width dimension is greater than the gap dimension L2. According to an exemplary embodiment, the gap dimension L2 is at least 1 millimeter, such as at least 2 millimeters, at least 5 millimeters, and/or no more than 500 centimeters.

Referring to FIG. 4, the furnace system 410 includes a binder burn-off location B' and a sintering location C'. The burn-off location B' is configured to burn binder material from the workpiece and the sintering location C' is configured to at least partially sinter the workpiece. According to an exemplary embodiment, the furnace system 410 includes a heat source 416, such as an electric resistance heating element, gas or oil burners, or other sources of heat. Barriers or walls 418 may be formed from refractory material. In other embodiments, the burn-off location B may have a heat source that is separated from the sintering location C'.

The workpiece, prior to entering the binder burn-off location B' may experience a first temperature, such as room temperature (e.g., 25° C.). Near the binder burn-off location B', the temperature experienced by the workpiece may be greater than room temperature, such as at least 200° C., at least 400° C.'. As the workpiece nears and passes the sintering location C', the temperature experienced by the workpiece may be greater still than that experienced by workpiece near the binder burn-off location B', such as at least 800° C., at least 1000° C. Portions of the workpiece beyond the sintering location C', on the side of the sintering location C' opposite to the binder burn-off location B', may then experience a lower temperature, such as experiencing room temperature.

Referring now to FIG. 5, a cast of 3 mole-percent Yttria-Stabilized Zirconia (3YSZ) green ceramic may be produced, as described in U.S. Pat. No. 8,894,920. In one example, from the cast, a green tape 512 of material, 2.5 cm wide by 5 m long was cut. The green tape 512 was wound onto a cylindrical roller 514 and was then fed at a controlled rate of 2 inches per minute into a furnace system 516, as shown in FIG. 5 (see also furnace system 410, as shown in FIG. 4).

The sintering location C" of the furnace system 516 was held at 1200° C. A binder burn-off location B" was insulated and built out of alumina fiberboard to provide a region for binder burnout. In this example, the binder burn-off location B" was heated by hot gasses exiting the sintering location C' of the furnace system 516.

In the configuration 510 shown, Applicants have found that a 10 inch long binder burn-off location B" (shown with length in the vertical direction) allowed the tape 512 to be successfully fed at up to about 3 inches per minute. The sintering location C" of the furnace system 516 shown is twelve inches, resulting in a total time in the sintering location C" of about four to six minutes. At the exit of the furnace system 516, the 3YSZ tape 512' is partially sintered, having a relative density of about 0.65. The 3YSZ tape 512' has sufficient strength for handling, is flexible, and is about 40 micrometers thick. As shown in FIG. 5, several meters of sintered tape 512' have been reoriented on a supportive plastic carrier film 518.

Applicants have found that the binder burn-off location B" should be at a temperature in the range of about 200 to 600° C. range for polyvinyl butyral (PVB) binder. Applicants have found that sufficient length of this binder burn-off location B" may also allow high tape speed through the furnace system 516 because if the binder burn-off location B" is too short, binder may be removed at an excessive rate, which may cause uncontrolled binder elimination and failure of the tape 512. Further, Applicants have found the length of the binder burn-off location B" relates to the rate at which the tape 512 may be successfully sintered. In some embodiments, the length of the binder burn-off location B" is at least 2 inches and/or no more than 50 inches, such as at least 4 inches and/or no more than 20 inches. In other contemplated embodiments, the binder burn-off location B" may have a length outside of the above ranges.

Referring still to FIG. 5, in another example, tape 512, this time alumina green ceramic, was produced and fired using configuration 510. The process of casting the tape 512 included steps of batching, milling, de-gassing (or de-airing), filtration, and tape manufacturing. For batching, alumina powder was mixed with a water-based tape casting ingredients including a binder, a dispersant, a plasticizer, and a de-foaming agent. Ingredients used were produced by Polymer Innovations, including an acrylic-based binder that is water soluble.

For milling, the batched material was milled and mixed in a mill by, for example: ball milling, high shear mixing, attrition milling, vibratory milling, roller milling, and like methods. The milling step de-agglomerates particles and creates a uniform, well-dispersed slurry. In some embodiments, Applicants found an attrition mill (also called a stirred ball mill), from Union Process, may facilitate de-agglomeration by breaking up agglomerates or nano-agglomerates of alumina powder. Applicants believe the attrition mill has benefits over other milling processes and equipment due to high energy input to the materials during the milling process, which allows the batch to be milled to smaller particle sizes in a shorter period of time compared to other techniques, for example, 1 to 3 hours versus 50 to 100 hours with ball milling.

One Union Process attrition mill used had a total volume of 750 milliliters (mL) and a working volume/capacity of 250 mL. The tank was loaded with 130 mL of slurry and 740 grams of 2 mm 99.9% pure alumina media (i.e., grinding media). The tank was water cooled to 15° C. during the milling process to avoid overheating and to reduce evaporation of solvent(s). The slurry was initially milled for 5 minutes at 500 revolutions per minute (rpm) to break down large agglomerates, then the speed was increased to 1300 rpm and milled for 1 hour. At the end of milling, the tank was slowed to 170 rpm and a de-foaming agent was added to remove entrapped air. The slurry was then poured through a 80 to 120 mesh screen to remove the milling media from the slurry before de-gassing.

For de-gassing, such as after milling, Applicants found that the milled media may be strained from the slurry, and the slurry may be de-aired/de-gassed using a vacuum to remove entrapped air from the milled product that may otherwise include bubbles within the mix. De-gassing may be accomplished with a desiccator chamber and then a Mazerustar vacuum planetary mixer. The slurry may be loaded into a desiccator chamber and de-gassed for up to 10 minutes. After the initial de-gassing, the slurry may be loaded into the planetary mixer and operated under vacuum for 5 minutes. Applicants found that an alternative de-gassing procedure, eliminating the Mazerustar mixer, is to use a higher vacuum in the desiccator chamber.

For filtration, the slurry was filtered to remove any large scale contamination from the mixture. Such contaminates may otherwise give adverse optical properties in the sintered material, for example. Filtering may be accomplished with 50 micrometers, 25 micrometers, 10 micrometers, or 1 micrometer filters. Such filters may be made of, for example, nylon, fiber, or other suitable materials.

For the tape manufacturing step, samples were cast on a silicone-coated Mylar® film, which was approximately 50 to 150 micrometers thick. Applicants find that the silicone coating provides easy release of the tape material after drying. Other suitable films for tape 512 may be, for example, Teflon®, glass, a metal belt, and like alternative materials. To facilitate the tape manufacturing, the slurry was passed under a doctor blade which had a gap of about 4 to 20 mils (about 100 to 500 micrometers) to form a thin sheet of ceramic tape. Typically an 8 mil (about 200 micrometers) blade height was used. The casting blade was moved across the Mylar® at a speed of 10 mm/sec. The speed may be varied as needed to increase process speed, and to modify the thickness of the tape 512. After drying, the thickness of the tape was 100 to 150 micrometers. The tape 512 in this state is referred to as "green tape."

Still referring to FIG. 5, a 1.2 meter long by 120 micrometer thick and 1.2 centimeter wide tape 512 of was cut out of the green casting described above and released. The tape 512 was wound onto the cylindrical roller 514. The tape 512 was then fed at a controlled rate of 1 inch per minute into the furnace system 516, as shown in FIG. 5. The tape 512 had sufficient strength to hold together under its own weight during binder burn-off. The sintering location C" of the furnace system 516 was maintained at a temperature of 1100 C. At the exit of the furnace system 516, the alumina tape 512' was partially sintered, having relative density of approximately 0.7. The fired thickness of the tape 512' was about 100 micrometers.

Figures 6A, 6B:
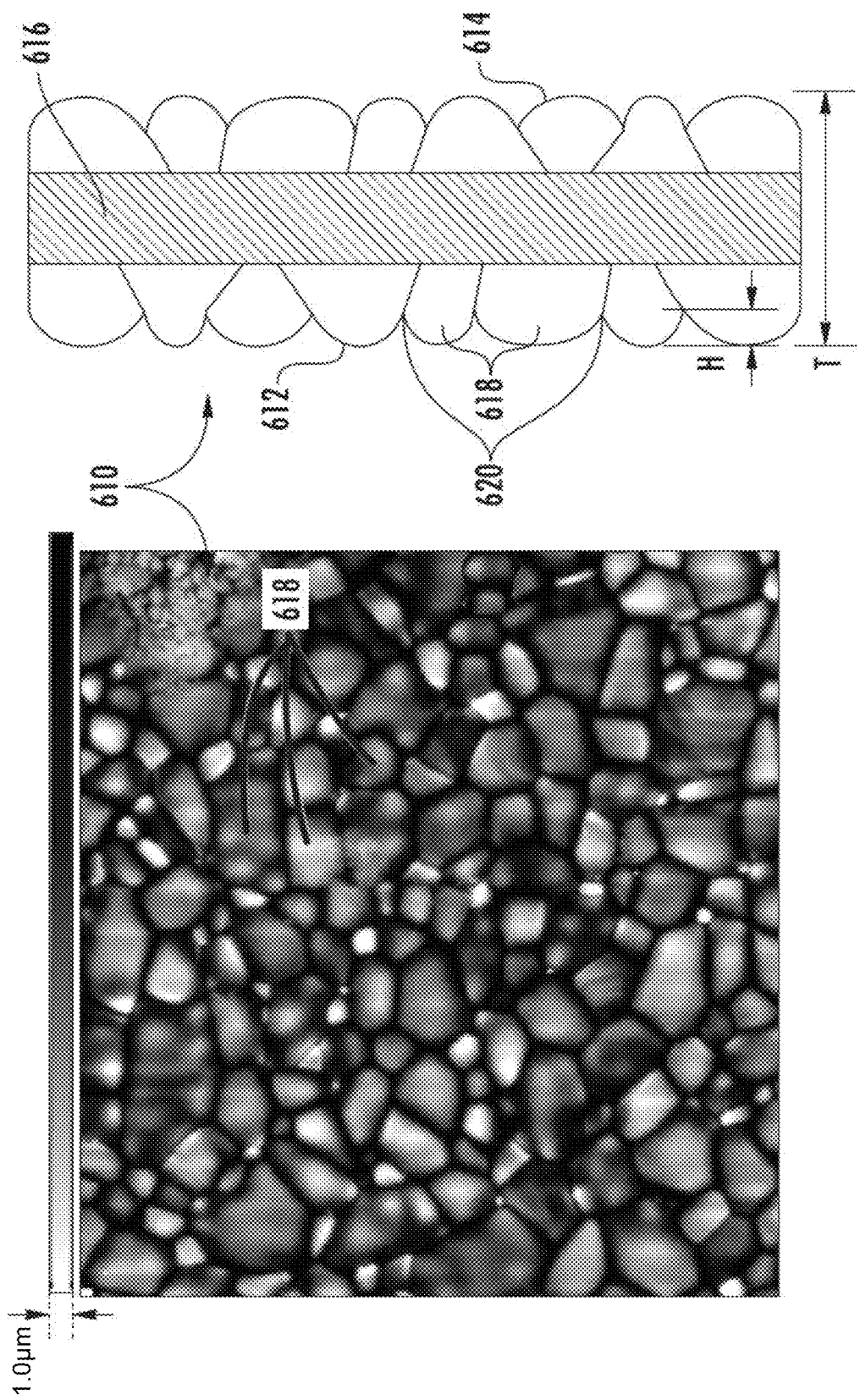
FIG. 6A is a digital image of an unpolished surface of a sintered ceramic.
FIG. 6B is a conceptual side profile of unpolished sintered ceramic.

Referring to FIGS. 6A-6B, materials manufactured according to inventive processes disclosed herein and with inventive equipment disclosed herein may be distinguished from materials manufactured according to conventional processes. According to an exemplary embodiment, a sintered article 610 (e.g., sheet, foil) includes a first surface 612 (e.g., top, side) and a second surface 614 (e.g., bottom), which may be opposite to the first surface 612. The sintered article further includes a body 616 of material extending between the first and second surfaces 612, 614.

A thickness T of the article 610 may be defined as a distance between the first and second surfaces 612, 614. A width of the article 610 (see generally width W of sintered sheet 810 of FIG. 8) may be defined as a first dimension of one of the first or second surfaces 612, 614 that is orthogonal to the thickness T. A length of the article 610 (see generally width L of sintered sheet 810 of FIG. 8) may be defined as a second dimension of one of the first or second surfaces 612, 614 that is orthogonal to both the thickness T and the width. According to an exemplary embodiment, the sintered article 610 is an elongate thin tape of sintered material. Due at least in part to geometry, some such embodiments are flexible, allowing the article 610 to bend around a mandrel or spool (e.g., diameter of 1 meter or less, 0.7 meters or less), which may be beneficial for manufacturing, storage, etc. In other embodiments, the sintered article 610 may be otherwise shaped, such as round, annular, sleeve- or tube-shaped, not have a constant thickness, etc.

According to an exemplary embodiment, the length of the article 610 is greater than twice the width of the article 610, such as at least 5 times, at least 10 times, at least 100 times greater. In some embodiments, the width of the article 610 is greater than twice the thickness T of the body, such as at least 5 times, at least 10 times, at least 100 times greater. In some embodiments, the width of the article 610 is at least 5 millimeters, such as at least 10 mm, such as at least 50 mm. In some embodiments, the thickness T of the article 610 is no more than 2 centimeters, such as no more than 5 millimeters, such as no more than 2 millimeters, such as no more than 1 millimeter, such as no more than 500 micrometers, such as no more than 200 micrometers. According to an exemplary embodiment, as green tape is passed into a furnace and allowed to sinter, the sintering occurs nearly uniformly; and length, width and thickness of the sheet may diminish up to approximately 30%. As such, dimensions of green tape disclosed herein may be 30% greater than those described for the sintered articles above. Thin tapes may allow the manufacturing line to operate rapidly because heat from the furnace can quickly penetrate and sinter such tapes. Further thin tapes may be flexible, facilitating bends and changes in direction along the manufacturing line (see generally FIG. 11 for example).

According to an exemplary embodiment, the sintered article 610 is substantially unpolished such that either or both of the first and second surfaces 612, 614 have a granular profile, such as when viewed under a microscope, as shown in the digital image of FIG. 6A and conceptually shown in the side view of FIG. 6B. The granular profile includes grains 618 protruding generally outward from the body 616 with a height H (e.g., average height) of at least 25 nanometers and/or no more than 100 micrometers relative to recessed portions of the surface at boundaries 620 between the grains 618, such as the height H of at least 50 nanometers and/or no more than 80 micrometers. In other embodiments, the height H may be otherwise sized.

The granular profile is an indicator of the process of manufacturing the sintered article 610 in that the article 610 was sintered as a thin tape, as opposed to being cut from a boule, and that the respective surface 612, 614 has not been substantially polished. Additionally, compared to polished surfaces, the granular profile may provide benefits to the sintered article 610 in some applications, such as scattering light for a backlight unit of a display, increasing surface area for greater adhesion of a coating or for culture growth. In contemplated embodiments, the unpolished surfaces 612, 614 have a roughness from about 10 to about 1000 nanometers across a distance of 10 millimeters in one dimension along the length of the article, such as from about 15 to about 800 nanometers. In contemplated embodiments, either or both of the surfaces 612, 614 have a roughness of from about 1 nm to about 10 µm over a distance of 1 cm along a single axis.

Figure 7B:
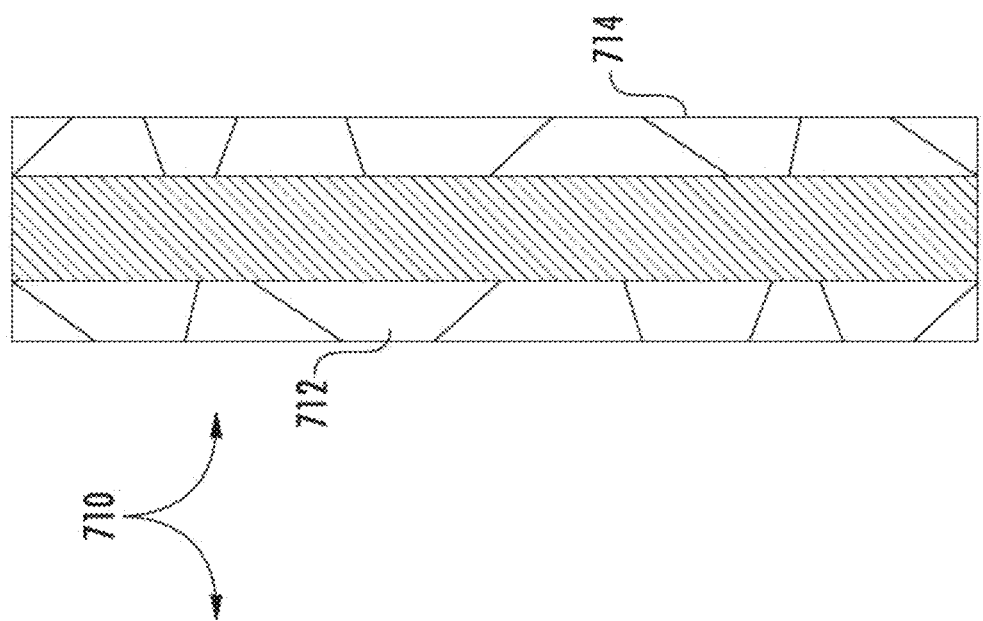
FIG. 7B is a conceptual side profile of polished sintered ceramic.
Figure 7A:
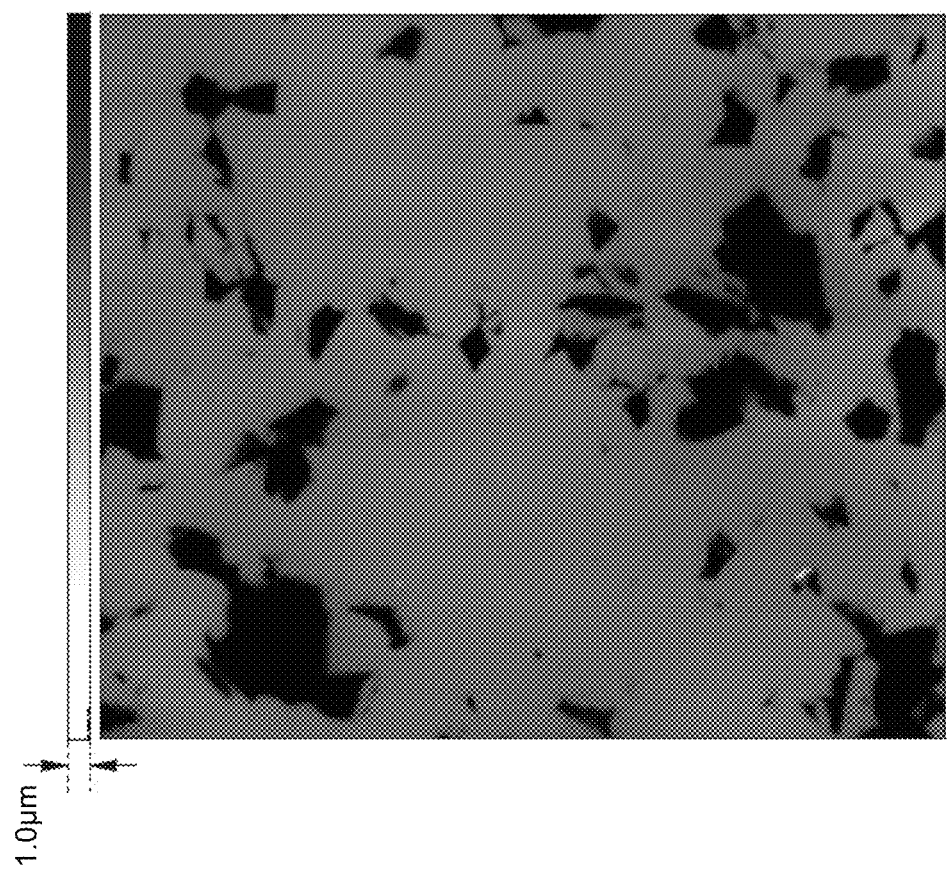
FIG. 7A is a digital image of a polished surface of a sintered ceramic.

By contrast, the sintered article 710, of the same material as sintered article 610, includes polished surfaces 712, 714, where grain boundaries are generally removed due to the polishing. In contemplated embodiments, sintered articles 610 manufactured according to the processes disclosed herein may be polished, as shown in FIGS. 7A-7B; depending upon, for example, the particular intended use of the article. For example, use of the article 610 as a substrate may not require an extremely smooth surface, and the unpolished surface of FIGS. 6A-6B may be sufficient; whereas use of the article as a mirror or as a lens may require polishing as shown in FIG. 7A-7B. However, as disclosed herein, polishing may be difficult for particularly thin articles or those that are thin with large surface areas.

Applicants believe that sheets of sintered ceramic or other materials cut from boules may not have readily identifiable grain boundaries present on surfaces thereon, in contrast to the article of FIGS. 6A-6B. Applicants further believe that boule-cut articles may typically be polished to correct rough surfaces from the cutting. But, Applicants believe that surface polishing may be particularly difficult or cumbersome for very thin articles of sintered ceramic or other materials, with the degree of difficulty increasing as such articles are thinner and the surface areas of such articles are larger. However, sintered articles manufactured according to the presently disclosed technology may be less constrained by such limitations because articles manufactured according to the present technology may be continuously manufactured in long lengths of tape. Further, dimensions of furnace systems, as disclosed herein, may be scaled to accommodate and sinter wider articles, such as having a width of at least 2 centimeters, at least 5 centimeters, at least 10 centimeters, at least 50 centimeters.

Figure 2:
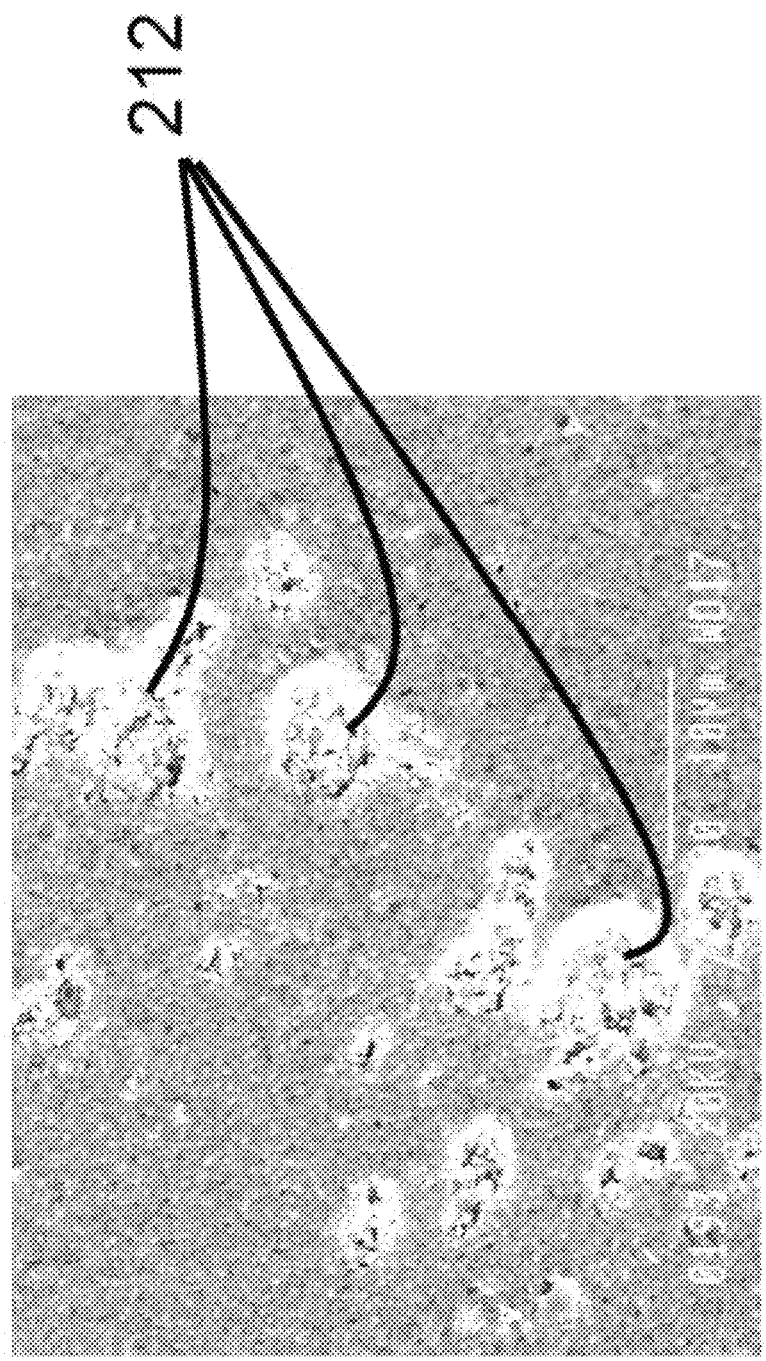

According to an exemplary embodiment, the sintered article 610 has a granular profile and has consistent surface quality on surfaces 612, 614 thereof, which may be very different from articles manufactured using setter boards, as discussed in the Background, where one side is typically marked by contact (e.g., adhesions and/or abrasions) from the setter board while the other side may not be exposed to the setter board. In some embodiments, such as where the sintered article 610 is in the form of a sheet or tape (see generally sheet 810 as shown in FIG. 8), the surface consistency is such that an average area of surface defects per square centimeter of the first surface is within plus or minus fifty percent of an average area of surface defects per square centimeter of the second surface, where "surface defects" are abrasions and/or adhesions having a dimension along the respective surface of at least 15, 10, and/or 5 micrometers, as shown in FIGS. 1-2 for example, such as within plus or minus thirty percent of an average area of surface defects per square centimeter of the second surface, such as within plus or minus twenty percent of an average area of surface defects per square centimeter of the second surface.

According to an exemplary embodiment, the sintered article 610 has high surface quality, which again may be very different from articles manufactured using setter boards, as discussed in the Background, where adhesions and/or abrasions from the setter board may lower surface quality. In some embodiments, such as where the sintered article 610 is in the form of a sheet or tape (see generally sheet 810 as shown in FIG. 8), the surface quality is such that, on average per square centimeter, the first and second surfaces both have fewer than 15, 10, and/or 5 surface defects having a dimension greater than 15, 10, and/or 5 micrometers, such as fewer than 3 such surface defects on average per square centimeter, such as fewer than one such surface defect on average per square centimeter. Accordingly, sintered articles manufactured according to inventive technologies disclosed herein may have relatively high and consistent surface quality. Applicants believe that the high and consistent surface quality of the sintered article 610 facilitates increased strength of the article 610 by reducing sites for stress concentrations and/or crack initiations.

According to an exemplary embodiment, the article 610, and the corresponding material of the grains of the green tape, includes polycrystalline ceramic. According to an exemplary embodiment, the article 610 includes (e.g., is, consists essentially of, consists at least 50% by weight of) zirconia, alumina, spinel (e.g., $MgAl_2O_4$, $ZnAl_2O_4$, $FeAl_2O_4$, $MnAl_2O_4$, $CuFe_2O_4$, $MgFe_2O_4$, $FeCr_2O_4$), garnet, cordierite, mullite, perovskite, pyrochlore, silicon carbide, silicon nitride, boron carbide, titanium diboride, silicon alumina nitride, and/or aluminum oxynitride. In some embodiments, the article 610 is a metal. In other embodiments, the article 610 is glass sintered from powder grains. In some embodiments, the article 610 is an IX glass and/or glass-ceramic. Materials disclosed herein may be synthetic.

Referring momentarily again to FIG. 6, the granular profile includes grains 618 protruding generally outward from the body 616 with a height H (e.g., average height) of at least 5 nanometers, such as at least 10 nanometers, such as at least 20 nanometers, such as at least 25 nanometers and/or no more than 200 micrometers, such as no more than 100 micrometers, no more than 80 micrometers no more than 50 micrometers relative to recessed portions of the surface at boundaries 620 between the grains 618.

Referring now to FIG. 8, in some embodiments, a sintered article is in the form of a sheet 810 (e.g., sintered tape) of a material disclosed herein. The sheet 810 includes a surface 814 (e.g., top or bottom) with another surface opposite thereto and a body extending between the two surfaces 814 (see generally sides 612, 614 and body 616 of article 610 of FIGS. 6A-6B). According to an exemplary embodiment, a width W of the sheet 810 is defined as a first dimension of one of the surfaces 814 orthogonal to the thickness T'. According to an exemplary embodiment, the sheet 810 has at least two generally perpendicular lengthwise side edges 812. A length L of the sheet 810 is defined as a second dimension of one of the top or bottom surfaces 814 orthogonal to both the thickness T' and the width W. The length L may be greater than or equal to the width W. The width W may be greater than or equal to the thickness T'.

According to an exemplary embodiment, the thickness T' is no more than 500 micrometers, such as no more than 250 micrometers, such as no more than 100 micrometers, and/or at least 20 nanometers. According to an exemplary embodiment, the sheet 810 has a surface area of at least 10 square centimeters, such as at least 30 square centimeters, such as at least 100 square centimeters, and even exceeding 1000, 5000, or even 10,000 square centimeters in some embodiments; or is otherwise sized according to geometries disclosed herein, such as with regard to embodiments of the article 610. In some embodiments, the sheet 810 has a width W that is less than ¼, ⅕, ⅙, ⅐, ⅛, ⅑, ⅒ and/or 1/20 the length L thereof. Such geometries may be particularly useful for certain applications, such as for use of the sheet 810 as a substrate of a rectilinear battery and/or for use of the sheet 810 as a surface for growing carbon nanotubes in an oven, where the sheet 810 fills surfaces of the oven, yet does not fill substantial volume of the oven.

According to an exemplary embodiment, the sheet 810 includes (e.g., is formed from, consists of, consists essentially of, consists more than 50% of in volume) a material selected from the group consisting of polycrystalline ceramic and synthetic mineral. In other embodiments, the sheet 810 includes glass, metal or other materials, as disclosed herein. Further, according to an exemplary embodiment, the material of the sheet 810 is in a sintered form such that grains of the material are fused to one another (see generally FIG. 6A). The sheet 810 may have a granular profile (see generally FIGS. 6A-6B) or may be polished (see generally FIGS. 7A-7B).

For example, in some embodiments, the sheet 810 is made from alumina powder having a median particle size diameter of from 50 to 1000 nanometers and a BET surface area of from 2 to 30 $m^2/g$. The sheet 810 is made from a tape-casted alumina powder of from 99.5 to 99.995 weight percent alumina and from about 100 to about 1000 parts per million of a sintering additive, such as magnesium oxide. In some embodiments, the sheet 810 is translucent. The sheet 810 may have a total transmittance of at least 30% at wavelengths from about 300 nm to about 800 nm when the sheet 810 has a thickness of 500 μm or less. In some embodiments, the total transmission through the sheet 810 is from about 50% to about 85% at wavelengths from about 300 nm to about 800 nm when the sheet 810 has a thickness of 500 μm or less. In some embodiments, diffuse transmission through the sheet 810 is from about 10% to about 60% at wavelengths from about 300 nm to about 800 nm when the sheet has a thickness of 500 μm or less. In contemplated embodiments, the sheet 810 may have the above-disclosed transmittance percentages with a wavelength in the above-disclosed ranges but with other thicknesses, such as other thicknesses disclosed herein. Materials disclosed herein other than alumina may also result in such a translucent sintered article.

Referring to FIG. 9, a manufacturing line 910 includes a source 912 of green tape 922, a furnace system 914, tension regulators 916, 918, and a receiver 920 of sintered tape 924. According to an exemplary embodiment, the source 912 of green tape 922 may be in the form of a roll of the green tape 922, as may be separately manufactured. From the source 912, the green tape 922 is directed into a first portion 926 of the furnace system 914 such as by way of a guiding passage 928.

Figure 3:
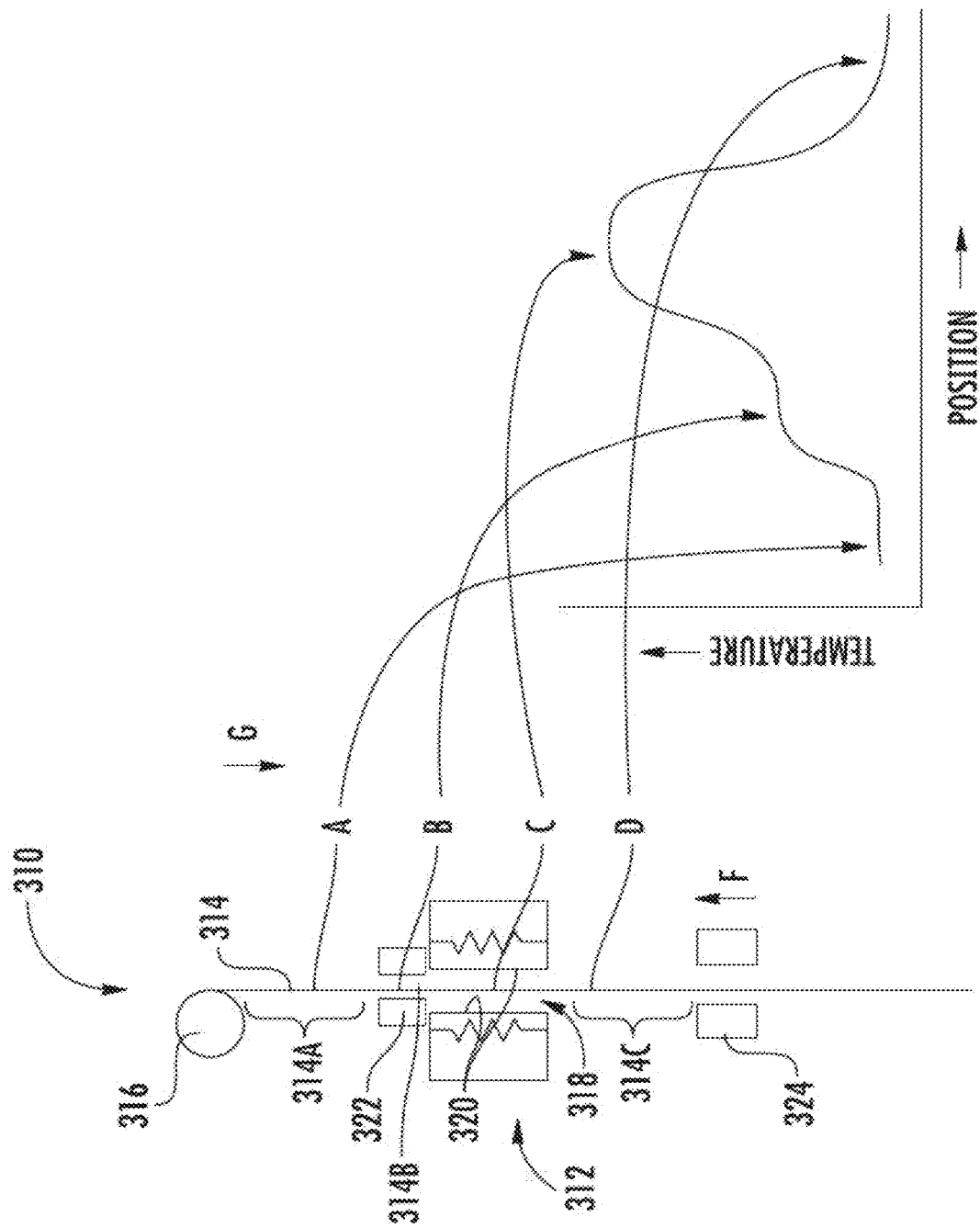
FIG. 3A is a schematic diagram of a manufacturing line according to an exemplary embodiment.
FIG. 3B is a plot conceptually showing temperature versus position along the manufacturing line of FIG. 3A.

The first portion 926 of the furnace system 914 may include a binder burn-off location (see generally location B of the manufacturing line of FIG. 3) and a location for partial sintering of the tape 912 (see generally location C of the manufacturing line of FIG. 3). Accordingly, tape 932 exiting the first portion 926 of the first system 914 may be partially sintered. Tension in the tape 922 through the first portion 926 of the furnace system 914 may be influenced by the tension regulator 916, which may differentiate tension in the tape 922, 932, 924 on either side of the tension regulator 916 along the manufacturing line 910. As shown in FIG. 9, below the tension regulator 916 the furnace system 914 includes a second portion 930.

According to an exemplary embodiment, tension in the tape 932, 924 between the tension regulators 916, 918 may be greater than tension in the tape 922, 932, 924 not between the tension regulators 916, 918. In some embodiments, increased tension between the tension regulators 916, 918 may be used to hold the tape 932 flat as the tape 932 is sintered in the second portion 930 of the furnace system 914.

For example, partially sintered tape 932 may be flexible enough to bend and/or flatten by tension in the tape 932 between the tension regulators 932, 918, yet the partially sintered tape 932, due to the bonds of partial sintering, may be strong enough to support the tension without failure. Put another way, in the second portion 930 of the furnace system 914, the partially sintered tape 932 is sintered to a final density and held under enough tension to flatten the sheet, tape or ribbon, eliminating curl, warp, camber, etc. that may appear with unconstrained sintering. For example, Applicants found a 1 centimeter wide partially-sintered ribbon of zirconia or alumina was able to support greater than 1 kilogram of tension, about 20 megapascals, without failure.

Accordingly, referring once more to FIG. 8, in contemplated embodiments, the unmodified surface of the sheet 810 has a flatness of from about 0.1 µm to about 50 µm over a distance of 1 cm along a single axis, such as along the length of the sheet 810. Such flatness, in combination with the surface quality, surface consistency, large area, thin thickness, and/or material properties of materials disclosed herein, may allow sheets, substrates, sintered tapes, articles, etc. to be particularly useful for various applications, such as tough cover sheets for displays, high-temperature substrates, flexible separators, and other applications.

Due to limited ability of garnet to creep or relax under pressure load, garnet may be difficult to reshape after the garnet has been manufactured. Accordingly, garnet may be difficult to manufacture thin and flat according to conventional processes. To do so, those of skill in the art have typically sandwiched green bodies between flat refractory surfaces, which typically results in many surface defects on both sides of the sintered article. Accordingly, the presently disclosed technology is believed to be particularly useful when manufacturing thin sheets of synthetic garnet as disclosed herein.

Referring to FIG. 10, a manufacturing line 1010, similar to manufacturing line 910 of FIG. 9, includes a source 1012 of green tape 1022, a furnace system 1014 having two separate portions 1026, 1030, tension regulators 1016, 1018, and a receiver 1020 of sintered tape 1024. However, with the manufacturing line 1010, the green tape is continuously manufactured on the line 1010. Further, the sintered tape 1024 is cut into strips 1032 (e.g., at least 5 centimeters long, at least 10 centimeters long, and/or no more than 5 meters long, no more than 3 meters long) as the sintered tape 1024 emerges from the second portion 1030 of the furnace system 1014. The strips 1032 subsequently may be stacked, packaged, and shipped.

Figure 11:
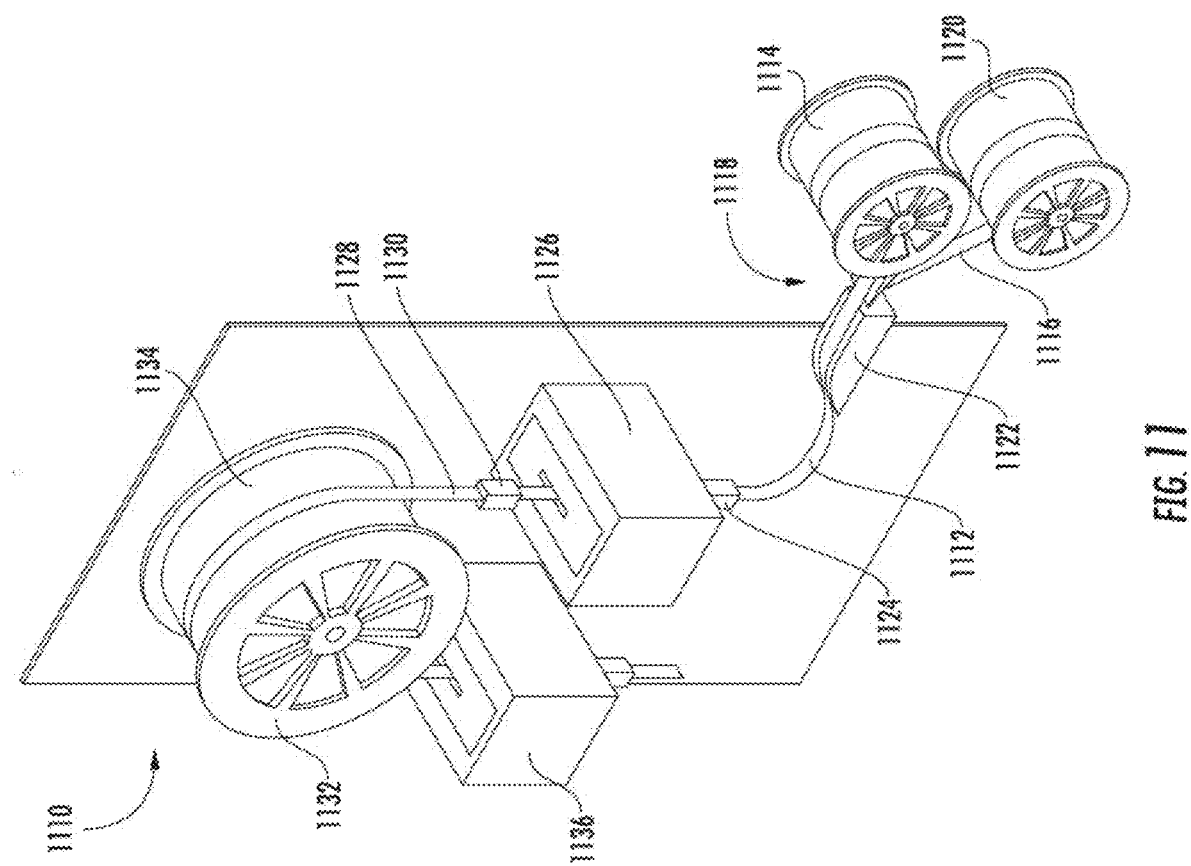

Referring to FIG. 11, a manufacturing line 1110 includes a source of tape 1112 (e.g., green tape). The source is in the form of a spool 1114 of the tape 1112, where the tape 1112 is initially on a polymeric backing 1116, such as Mylar. As the tape 1112 comes, generally horizontally, off the spool 1114 (e.g., within 30-degrees of horizontal, within 10-degrees of horizontal), the polymeric backing 1116 is pulled off the tape 1112 at a separation location 1118 and wound onto a separate spool 1120. The tape 1112 then passes over an air bearing 1122 and is gradually redirected, with a controlled amount of sag, into a first guide 1124, which orients the tape 1112 generally vertically (e.g., within 30-degrees of vertical, within 10-degrees of vertical).

Following the first guide 1124, the tape 1112, in a green form, moves upward into a first furnace 1126 (see generally furnace 410 as shown in FIG. 4). In some embodiments, the first furnace 1126 is a lower temperature furnace that chars or burns organic binder off of the tape 1112 to form an unbound section of the tape 1112. The first furnace 1126 may also partially sinter the resulting unbound section of the tape 1112, to form a partially sintered section 1128 of the tape 1112. After passing through the first furnace, the tape 1112 may be directed through a second guide 1130. The first and second guides 1124 1130 align the tape 1112 with a passage through the first furnace 1126 so that the tape 1112 does not contact surfaces of the first furnace 1126, thereby reducing the number of adhesion and abrasion related surface defects. Such a tape 1112 may still have some defects, such as due to contact with errant particles, etc.

According to an exemplary embodiment, following the second guide 1130, the partially sintered section 1128 of the tape is routed over a wheel 1132. In some embodiments, the wheel 1132 has a low-friction surface 1134, over which the partially sintered section 1128 slides. A temperature differential between the wheel 1132 and the partially sintered section 1128 may help inhibit sticking or adhesion between the wheel 1132 and the partially sintered section 1128. According to an exemplary embodiment, the wheel 1132 rotates to control tension in the tape 1112, such as by providing different tension in the tape 1112 on either side of the wheel 1132.

For example, in some instances, the wheel 1132 rotates (e.g., clockwise) against the direction (e.g., counter-clockwise) that the tape 1112 slides over the wheel 1132, decreasing tension in the tape 1112 on the side of the wheel 1132 from which the tape 1112 is coming and increasing tension in the tape 1112 on the side of the wheel 1132 to which the tape 1112 is going, with the increased tension being maintained on a distal end of the tape 1112 by a tension regulator, such as a spool receiving the tape 1112 (see generally FIGS. 3 and 9), a robotic arm drawing the tape 1112 (see generally FIG. 10), rollers, etc. Tension in the tape 1112 as the tape 1112 passes through a second, possibly higher temperature, furnace 1136, holds the tape 1112 flat as the tape 1112 is fully sintered.

Figure 12:
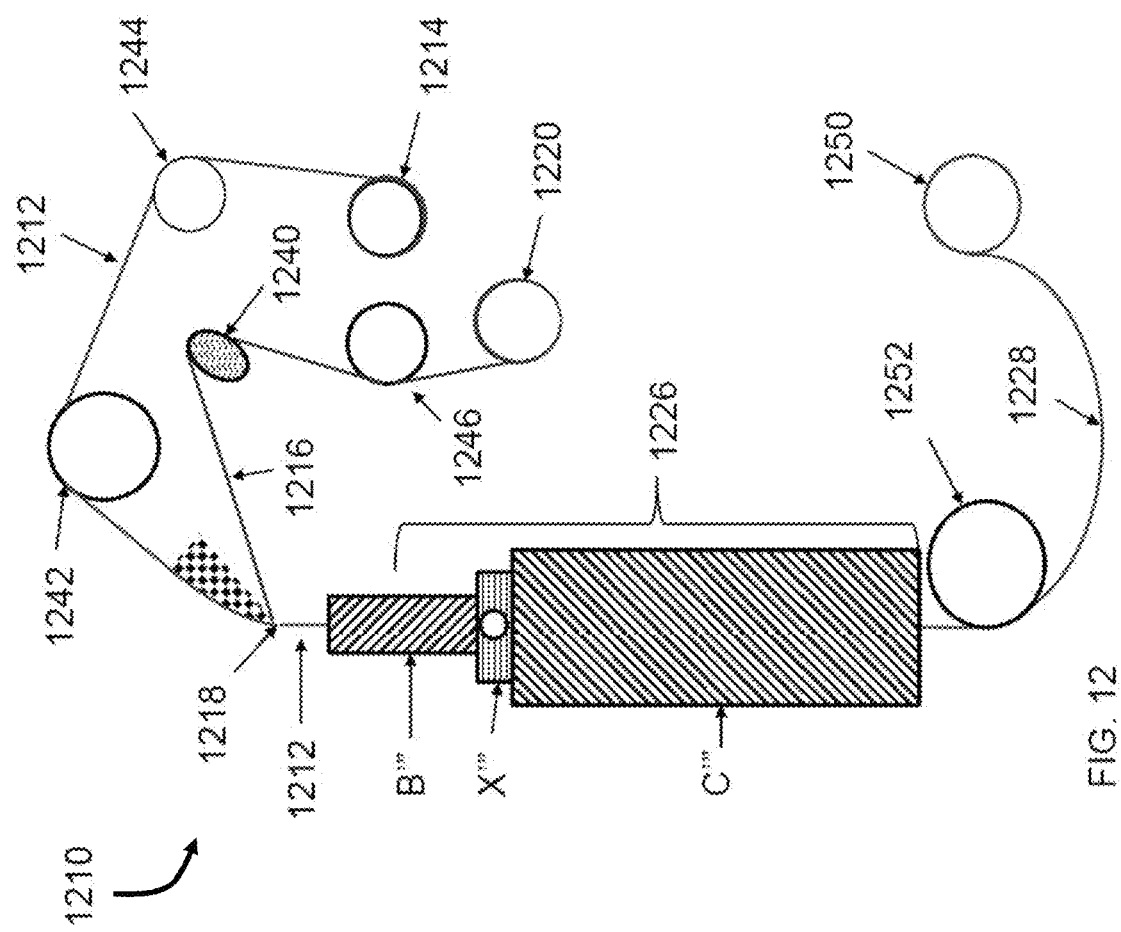
FIG. 12 is a schematic diagram of a manufacturing line, or a portion thereof, according to an exemplary embodiment.

Referring to FIG. 12, a manufacturing line 1210 for partial sintering includes a source of tape 1212 (e.g., green tape). The source is in the form of a spool 1214 of the tape 1212, where the tape 1212 is initially on a polymeric backing 1216, such as Mylar. In some such embodiments, the tape 1212 comes off the spool 1214 and over a roller 1244 and a vacuum hug drum 1242, then the polymeric backing 1216 is pulled off the tape 1212 at a separation location 1218 and is tensioned by a tension device 1240, passing over a roller 1246 and wound onto a separate spool 1220. The tape 1212 (without backing 1216) then passes into the binder burnout section B''' of the furnace 1226. In some such embodiments, the tape 1212 enters oriented generally vertically and/or without contacting the furnace 1226.

Following the separation location 1218, the tape 1212, in a green form, moves downward into the furnace 1226 (see also generally furnace 410, as shown in FIG. 4). In some embodiments, the binder burn out section B''' of furnace 1226 is a lower temperature furnace that chars or burns organic binder off of the tape 1212 to form an unbound section of the tape 1212. A higher temperature portion C''' of the furnace 1226 may also partially sinter the resulting unbound section of the tape 1212, to form a partially sintered section 1228 of the tape 1212, shown in FIG. 12 passing out of the furnace 1226.

After passing through the furnace 1226, the tape 1212 may be directed drawn across a roller 1252 that acts as second guide. The separation location 1218 and exit roller 1252 may align the tape 1212 with a passage through the furnace 1226 so that the tape 1212 does not contact surfaces of the furnace 1226, thereby reducing the number of adhesion and abrasion related surface defects. According to an exemplary embodiment, the separation location 1218 and roller 1252 or other guide at or near an exit of the furnace 1226 are generally vertically aligned with one another, such as along a line that is within 15-degrees of vertical, such as within 10-degrees.

Applicants note that such a tape 1212 may still have some defects, such as due to contact with errant particles, particles in the air, etc. The exit roller 1252 may be made of a low friction polymeric material. After passing over the exit roller 1252, the partially sintered tape can be wound on a receiving spool 1250.

Example 1

A 90 foot long tape of partially sintered zirconia tape was made with an apparatus generally as shown in FIG. 12. The green tape was made in manner similar to that described in U.S. Pat. No. 8,894,920 B2 using Tosho (Japan) zirconia powder 3YE. The green tape was cast at a width larger than about 20 cm and thickness of the green tape was about 25 micrometers. The tape was then manually slit to about 15 mm in width using circular razor blades. The green tape was passed from a pay-out spool (see generally spool 1214 in FIG. 12) over the separation location (see separation location 1218 in FIG. 12) and through a binder burn-out chimney (see burn-out section B''' of furnace 1226 in FIG. 12), through a transition zone (see zone X''' in FIG. 12) and into a higher temperature furnace (e.g., section C''' of the furnace 1226 in FIG. 12).

Referring to the Example 1 in the context of FIG. 12, at the separation location, 1218, the ceramic tape 1212 was released from the carrier film 1216. The carrier film 1216 was run over a tensioning device 1240 and on to a take-up spool 1220. The binder-burn out zone B''' was passively heated by hot air from the furnace section C'''. The channel in the furnace and binder burnout chimney used for Example 1 was made from ceramic fiber board in parallel plates with a gap of between 0.125 and 0.5 inches between the plates (see generally gap 414 and L2 of FIG. 4). The width of the channel orthogonal to the gap was about 3.5 inches. The length of the binder burnout zone was about 17 inches and the length of the furnace below the binder burnout zone was 24 inches.

Applicants note that the green tape can be threaded into the furnace either cold or hot. If threading hot, Applicants set a temperature near 1000° C. for the furnace and a tape speed of 1 inch/min, when sintering or partially sintering 3YSZ, 3 mol % yttria-stabilize zirconia, tetragonal-phase zirconia polycrystal "TZP", and/or alumina or other ceramics with similar sintering temperatures. After threading hot, after the tape comes out of the bottom of the furnace, the temperature can be increased and the speed of the tape increased. If threading cold, Applicants recommend moving (i.e., transporting, conveying) the tape at a low speed, 0.25 to 1 inch/min., during heat up through the furnace.

In this Example 1, the tape was threaded hot, and after threading, the furnace was heated to and set at 1200 C, and the tape was then moved at a speed of 8 inches/min. through the furnace. The binder burnout chimney was at a temperature of between about 100 to 400° C. The green tape was transported through the furnace for was over 2.25 hours, and about 90 feet of continuous length of partially sintered tape was obtained.

Sintering shrinkage in the width was about 9.5-10.5%. The partially sintered tape was rolled on a 3.25 inch diameter spool without cracking.

Example 2

A 65 foot length of partially sintered zirconia tape was made with an apparatus similar to that shown in FIG. 12, where the green tape was again made in manner similar to that described in U.S. Pat. No. 8,894,920 using Tosho (Japan) Zirconia powder 3YE. The green tape was cast at a width larger than about 20 cm. The thickness of the green tape was about 25 micrometers. The green tape was then manually slit to about 52 mm in width using circular razor blades.

Next, the green tape was passed from the pay-out spool over the separation location and through a binder burn-out chimney, through a transition zone, and into a higher temperature, actively-heated furnace (e.g., furnace 1226). The binder-burn out zone was passively heated by heated air from the furnace. The channel in the furnace and binder burnout chimney was (again) made from ceramic fiber board in parallel plates with a gap of between ⅛ and ½ inch between the plates. The width of the channel was about 3½ inches. The length of the binder burnout zone was about 17 inches and the length of the furnace was 24 inches.

In this Example 2, after threading, the furnace was heated to 1000° C., 1025° C., 1050° C., 1075° C., and 1100° C. while the tape was moved at a speed of 2 inches/min. therethrough. The binder burnout chimney was at a temperature of between about 100 and 400° C. Tape was run at the individual furnace temperatures for about an hour for each temperature. The furnace was run for over 6.5 hours, and over continuous 65 feet (green) of partially sintered tape was run through the furnace.

Sintering shrinkage across the width of the tape was dependent on furnace temperature and, as listed in the following Table 1. Some out of plane deformation was encountered and variation of the sintering shrinkage in the Table is partially due to the out of plane deformation of the tape.

TABLE 1

| 52 mm Green Tape | |
|---|---|
| Temperature | Shrinkage % |
| 1000° C. | 2.08% |
| 1000° C. | 1.56% |
| 1025° C. | 2.34% |
| 1050° C. | 3.47% |
| 1075° C. | 4.28% |
| 1100° C. | 5.61% |

In various embodiments disclosed herein, such as for materials and systems disclosed herein, the temperature of the higher-temperature furnace is at least 800° C., such as at least 1000° C. Green tap is passed therethrough at a rate of at least 1 inch/min, such as at least 2 inch/min. Rate may be increased by increasing the length of the furnace, for example. Shrinkage of green tape passing therethrough was at least 1.5%, such, as at least 2% in some embodiments and/or no more than 20%, such as no more than 15%.

Example 3

About a 60 foot length of partially sintered zirconia tape was made with an apparatus, similar to that shown in FIG.

12, where the green tape was again made in manner similar to that described in U.S. Pat. No. 8,894,920 using Tosho (Japan) zirconia powder 3YE. The green tape was cast at a width larger than about 20 cm. The thickness of the green tape was about 25 micrometers. The tape was then manually slit to about 35 mm in width using circular razor blades.

The green tape was passed from the pay-out spool over the separation location and through a binder burn-out chimney, through a transition zone and into the furnace. The binder-burn out zone was passively heated by heated air from the furnace. The channel in the furnace and binder burnout chimney was made from ceramic fiber board in parallel plates with a gap of between ⅛ and ½ inch between the plates. The width of the channel was about 3½ inches. The length of the binder burnout zone was about 17 inches and the length of the furnace was 24 inches.

In this Example 3, after threading, the furnace was heated to 1100° C., 1150° C. and 1200° C. while the tape was moved at a speed of 4 and 6 inches/minute. The binder burnout chimney was at a temperature of between about 100° C. and 400° C. About ten feet of the tape at each temperature and respective tape speed condition was spooled on to a 3.25 inch diameter spool after partial sintering, without breaking.

Sintering shrinkage was measured and is listed in the following Table 2, where some out of plane deformation was encountered and variation of the sintering shrinkage in the Table is partially due to the out of plane deformation of the tape.

TABLE 2

| Temp (° C.) | Speed (in/min) 35 mm green width | Shrinkage Percent |
|---|---|---|
| 1100 | 4 | 5.05 |
| 1100 | 6 | 5.16 |
| 1150 | 4 | 8.09 |
| 1150 | 6 | 6.73 |
| 1200 | 4 | 12.01 |
| 1200 | 6 | 11.20 |

Example 4

A 175 foot length of partially sintered zirconia tape was made with an apparatus shown in FIG. 12. Zirconia green tape was made as described above, but tape was manually slit to about 15 mm width using circular razor blades. The tape was passed from the pay-out spool over the separation location and through a binder burn-out chimney, through a transition zone and into the furnace. Temperatures of 1100° C. to 1200° C. and speeds of 4, 6, or 8 inches/min. were run. The binder burnout chimney was at a temperature of between about 100 and 400° C., and a total of 175 feet (green) of partially sintered tape was made.

Sintering shrinkage was measured and is listed in the following Table 3, where some out of plane deformation was encountered and the variation of the sintering shrinkage in the table is partially due to the out of plane deformation of the tape. Tape made at 1200 C and 8 inches per minute, had an average out of plane flatness over the length and width of the tape, of about 0.6 mm overall, when measured over 1200 mm along the length of the tape.

TABLE 3

| Temp (° C.) | Speed (IPM) 15 mm green width | Shrinkage Percent |
|---|---|---|
| 1100 | 4 | 5.38 |
| 1100 | 6 | 6.70 |
| 1100 | 8 | 5.07 |
| 1150 | 4 | 8.58 |
| 1150 | 6 | 8.16 |
| 1150 | 8 | 7.25 |
| 1200 | 4 | 11.89 |
| 1200 | 6 | 11.33 |
| 1200 | 8 | 10.07 |

Example 5

A 147 foot length of partially sintered zirconia tape was made with an apparatus similar to that shown in FIG. 12. Zirconia green tape was made as described above and slit to about 15 mm using circular razor blades. The tape was processed as described above, except where, after threading, the furnace was heated to and set at 1200° C., and the tape was moved at a speed of 8 inches/minute. The binder burnout chimney was at a temperature of between about 100° C. and 400° C. The green tape was moved through the furnace for over 3 hours, and over 147 feet of continuous length (green) of partially sintered tape was obtained.

Figure 13:
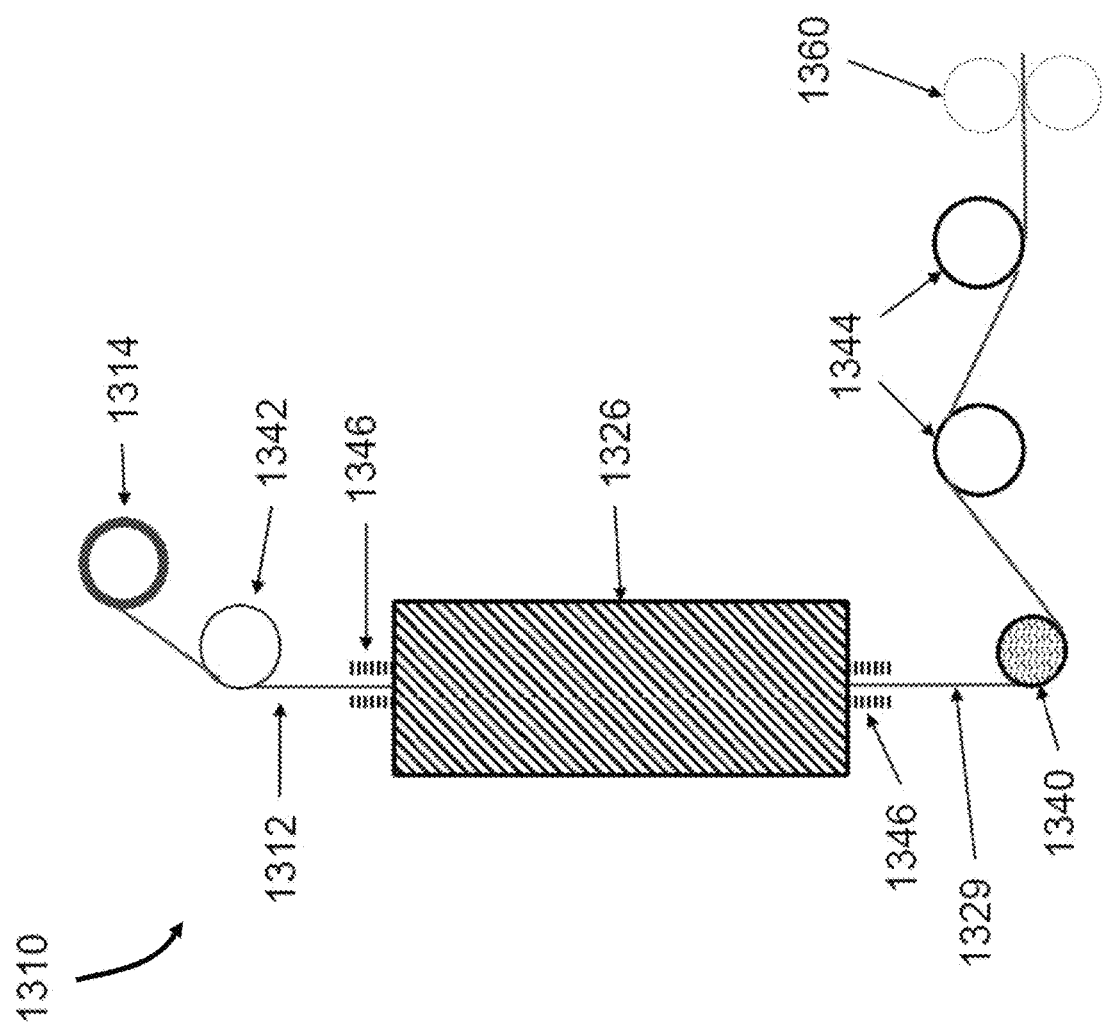
FIG. 13 is a schematic diagram of a manufacturing line, or a portion thereof, according to another exemplary embodiment.

Referring now to FIG. 13, a manufacturing line 1310 for partial sintering includes a source of partially sintered tape 1312. The source is in the form of a spool 1314 of the partially sintered tape 1312, where the tape 1312 may have an interleaf material. As the tape 1312 comes off the spool 1314 and over a roller 1342. Plates 1346 of high temperature material form a narrow channel in the furnace 1326.

The tape 1212 then passes into the furnace 1326, the tape 1312 being generally vertical and/or without contacting the furnace and/or without contacting the furnace along a central portion thereof. In contemplated embodiments, edges of the tape may contact guides or surfaces in the furnace, but may later be removed to provide a low-defect center portion of the tape, as disclosed herein. In some such embodiments, the lengthwise edges of the tape include indicia of cutting, such as laser or mechanical marks.

After passing through the furnace 1326, the final sintered tape 1329 may be drawn across a tension device 1340. The input roller 1342 and tension device, 1340, are generally linearly-aligned with the channel through the furnace 1326 so that the tape 1312 does not contact surfaces of the furnace 1326, in some such embodiments, thereby reducing the number of adhesion- and abrasion-related surface defects as described herein. After passing over the tension device 1340 the final sintered tape passes over two rollers 1344, and through a conveyance device 1360 (e.g., rollers, bearing, treads). After the conveyance device 1360 the final sintered tape can be spooled with or without interleaf material.

Figure 14:
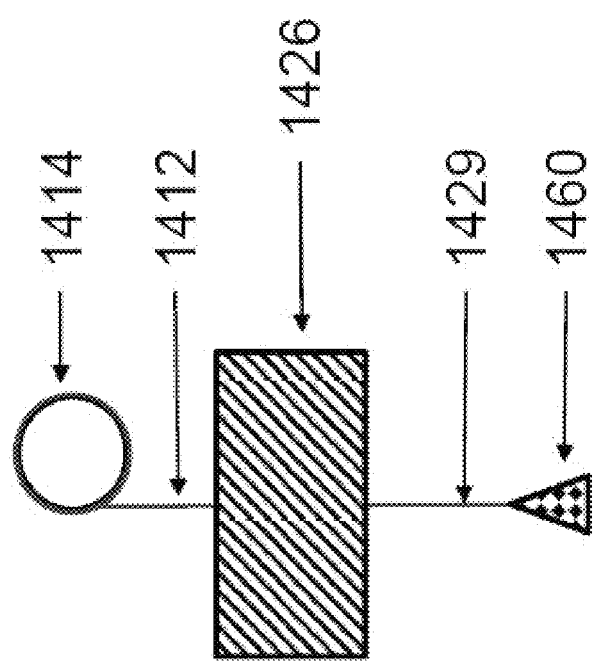
FIG. 14 is a schematic diagram of a manufacturing line, or a portion thereof, according to yet another exemplary embodiment.

Referring to FIG. 14, a manufacturing line 1410 for partial sintering includes a source of partially sintered tape 1412. The source is in the form of a spool 1414 of the partially sintered tape 1412, where the tape 1412 may have an interleaf material. As the tape 1412 comes off the spool 1414 the tape 1212 then passes into the furnace 1426, the tape 1412 being generally vertically oriented. A tensioner (e.g., weight 1460, rollers), is attached to the partially sintered tape to draw the tape and/or hold the tape flat during the sintering. In contemplated embodiments, the weight 1460 may be a length of the tape itself.

Surprisingly, as disclosed above, Applicants have found that a short length of the green tape, with the binder burned out, can support some tension, without the tape falling apart. The tensile strength of the section with burned-out binder, but prior to entering the higher-temperature furnace, is just a fraction of the tensile strength of ideal, fully-sintered tape of the same material and formed from a green tape of the same dimensions and composition, such as less than 20%, such as less than 10%, such as less than 5%, but is still positive, such as at least 0.05%.

Example 6

Partially sintered tape of 15 mm (green) width was made as described in Example 1. A roll of this partially sintered tape, 15 mm wide (green), about 25 micrometers thick (green), was then put on the apparatus similar to system 1310 shown in FIG. 13 (e.g., second furnace, second sintering location). The ceramic plates, 1346, were made of silicon carbide. The gap between the plates was 2 to 8 mm and the width of the plates was 4 inches. The outside dimension of the furnace was 21 inches long. The furnace was heated to 1400 C (e.g., at least 100° C. greater temperature than the furnace of Example 1, such as at least 200° C. greater, 400° C. greater).

In Example 6, the partially sintered tape (from Example 1) was rapidly threaded by hand into the 1400° C. furnace at greater than 1 foot/minute. Enough tape was provided from the spool 1314 that the tape 1312 was wound around the tensioning device 1340, through two rollers 1344, and through a conveyance device 1360.

Figure 17:
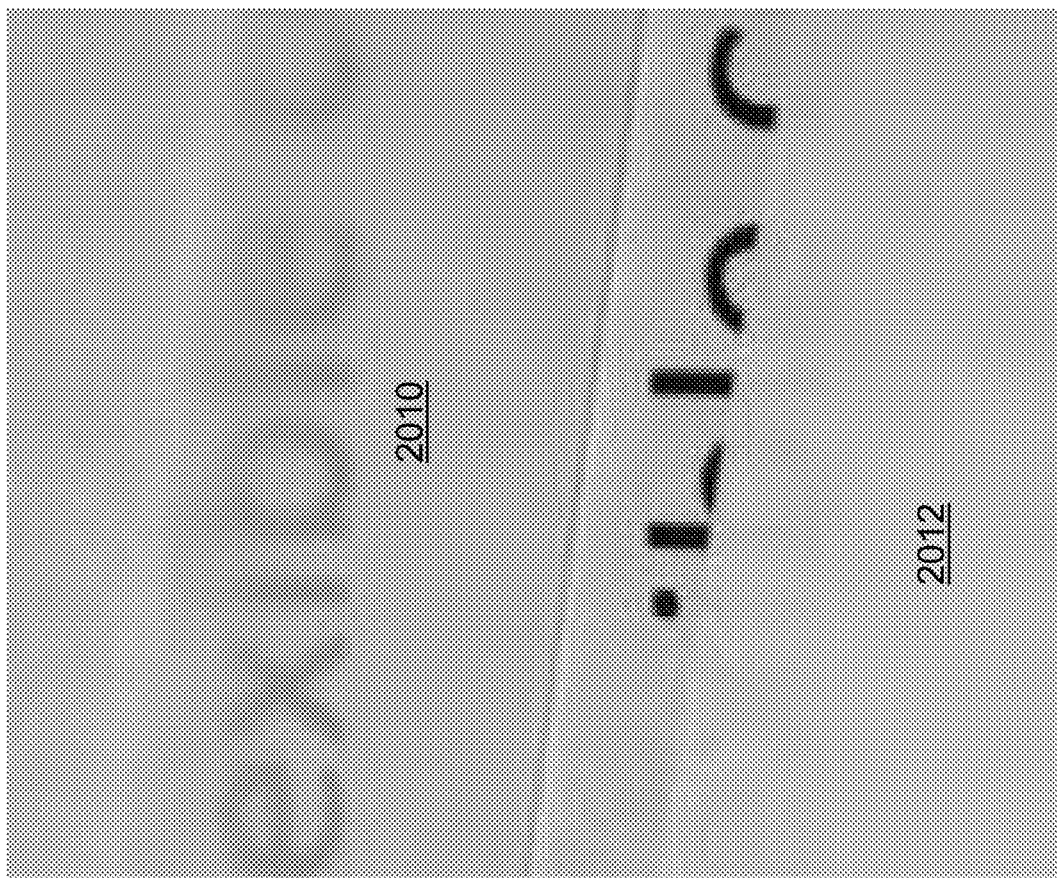
FIG. 17 compares partially and fully sintered tapes, made using inventive processes disclosed herein, overlaying dark lettering on white paper.
Figure 18:
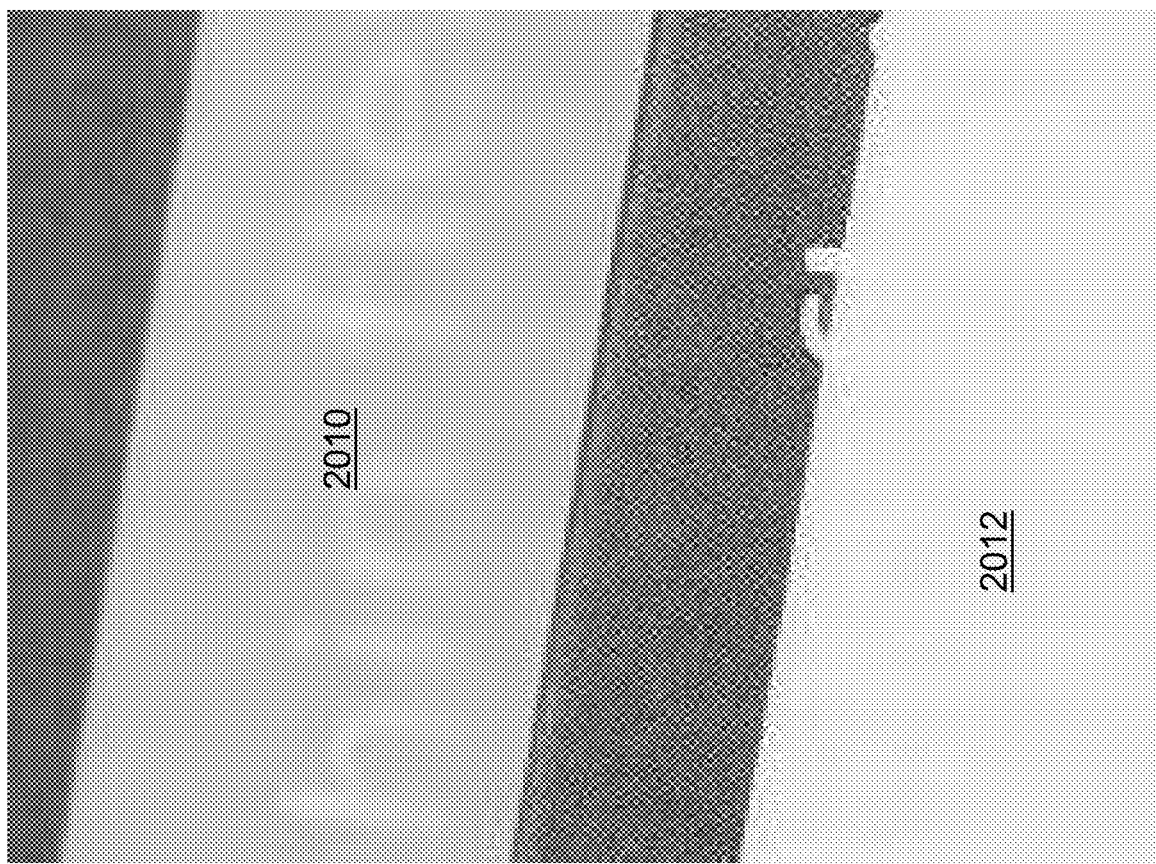
FIG. 18 compares partially and fully sintered tapes, made using inventive processes disclosed herein, overlaying white lettering on dark paper.

After threading, the tape was run at 2 inches per minute. Less than 50 grams of tension was put on the sintering tape by the tension device 1340. About 9 inches of dense, final sintered tape was produced (see, e.g., fully sintered tape 2010 of FIGS. 17-22). The tape was translucent, text could be read through it if the text was placed in contact with the tape (see fully sintered tape 2010 of FIGS. 17-18 and compare to partially sintered tape 2012 of FIGS. 17-18). The tape did have some white haze from light scattering, probably from a slight porosity (e.g., porosity less than 1%, such as less than 0.5%, and/or at least 0.1%).

Cross tape shrinkage was about 24%. Batch fired material of the same type of tape casting had a sintering shrinkage of about 23%, +/−about 0.5%. Although the partially sintered tape used for this experiment had some out of plane deformation, after final sintering, the tape was flat in the direction of tape motion. There was some "C-shaped" curl in the cross web (tape) direction. An area of 1 cm×1 cm of the fully sintered tape was examined by optical microscopy at 100-times magnification. Both sides of the final sintered tape were examined. No adhesion or abrasion defects typical of setter boards were found.

Figure 15:
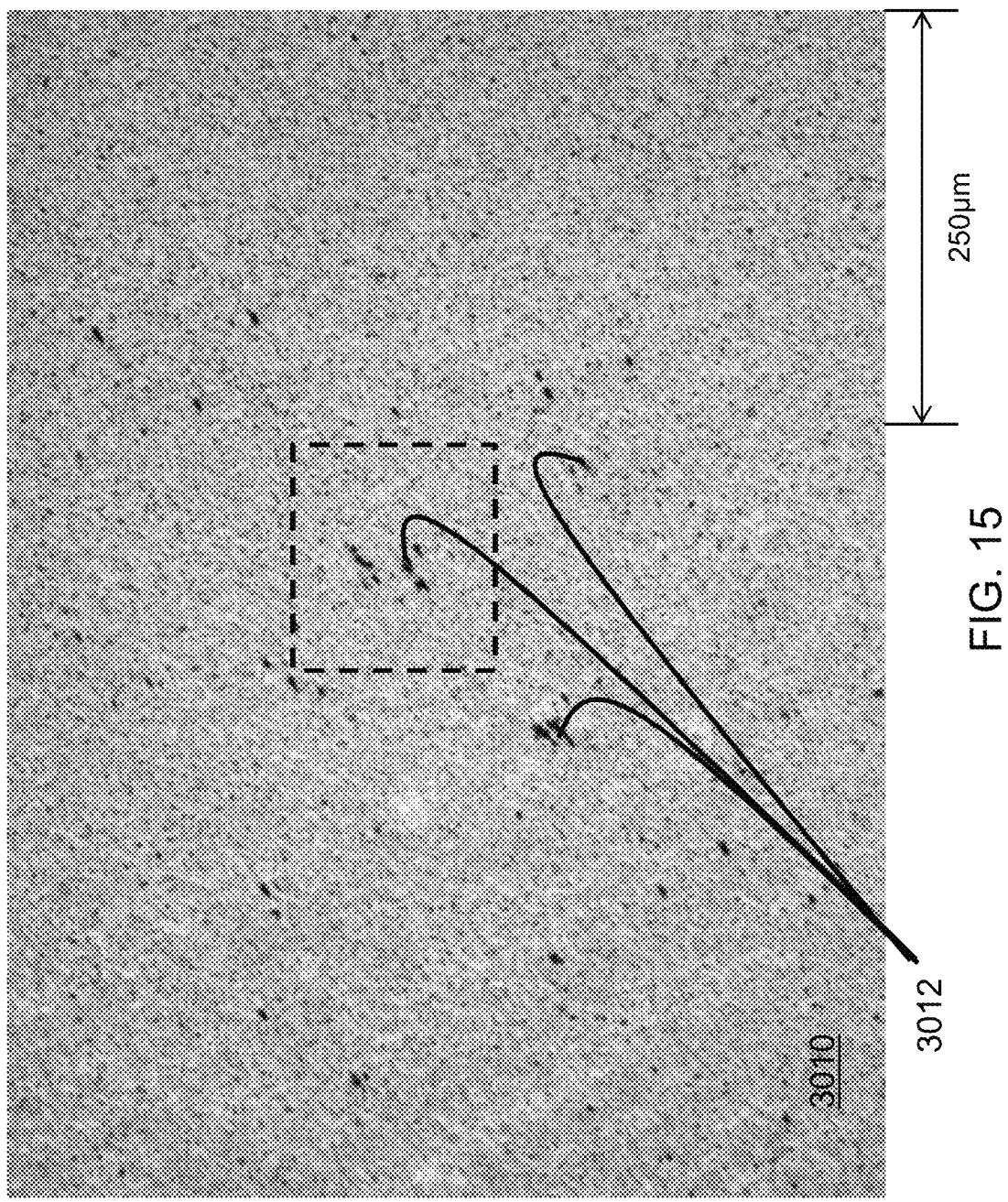
FIG. 15 is a micrograph of a thin ceramic sheet sintered on a setter board at 100 times magnification.

As seen in FIG. 15, the final sintered tape can be bent to a radius of less than about, 2.5 cm Example 7

A second-stage sintering apparatus, similar to that shown in FIG. 14 was used. The furnace was only about 4 inches high, with a 2-inch hot zone. Partially sintered tape of 30 mm wide (green) was used that was made in manner similar that described for Example 3. Prior to partial sintering, the tape was about 25 micrometers thick. A spool of the partially sintered tape was put over the furnace, where the furnace had a narrow gap of ³⁄₁₆th of an inch and 3.5 inches wide in the top and bottom furnace insulation, to allow the tape to pass through. The tape was threaded cold through the gaps and a weight of 7.5 grams was attached (see generally FIG. 14). The furnace was heated to 1450° C., and tape motion was started when the furnace achieved 1450° C. The tape was run from top to bottom at a speed of 0.5 inches per minute. About 18 inches of fully-sintered sintered zirconia tape was made. The zirconia tape was translucent. In Example 7, with the 4 inch furnace, the tape, as well as the fully sintered portion thereof, was longer than the furnace.

Figure 16:
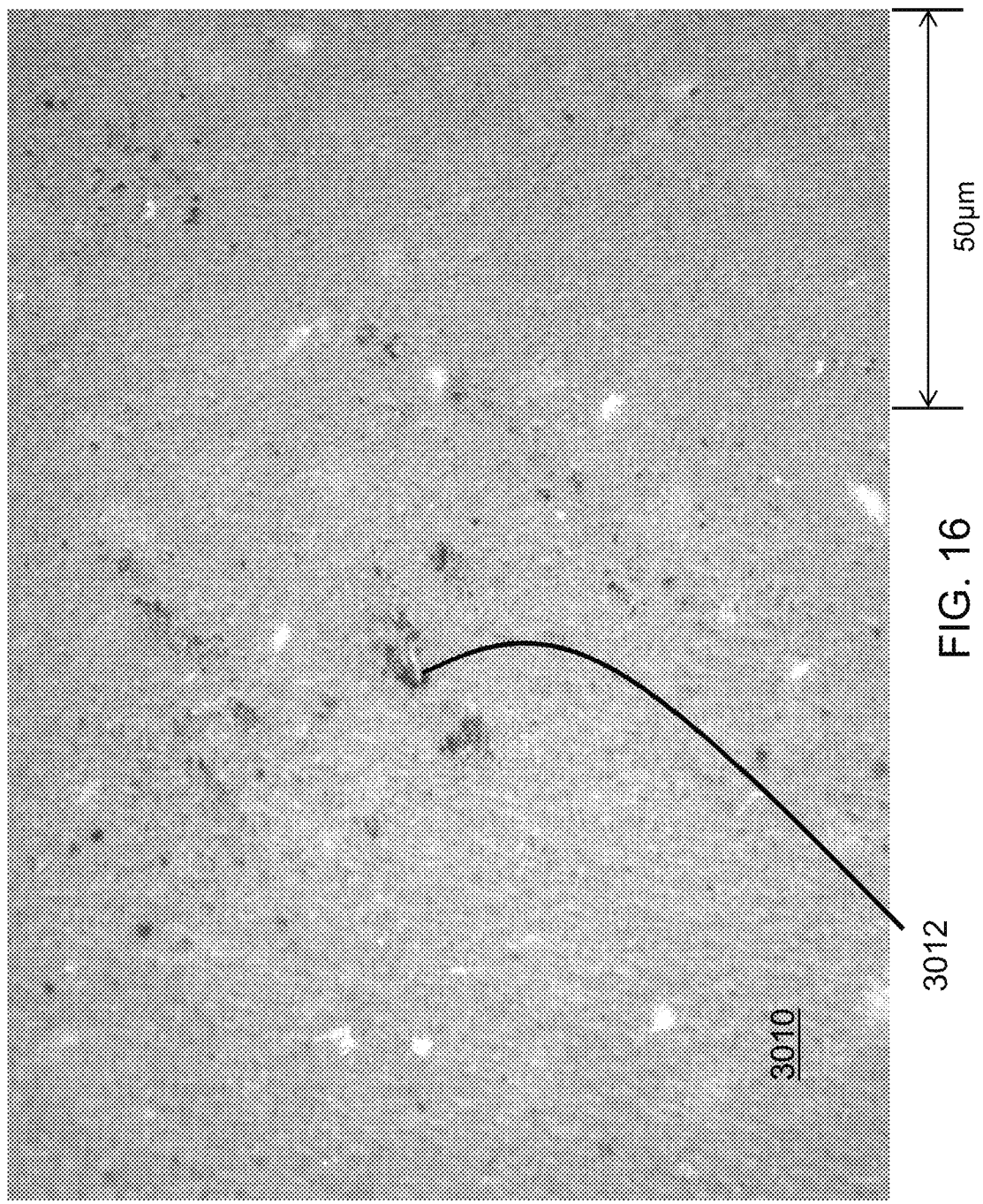
FIG. 16 is the same sheet as FIG. 15 at 500 times magnification, generally from within the dashed box shown in FIG. 15.

Referring to FIGS. 15-16, for context and comparison purposes, green tape (3 mol % yttria-stabilize zirconia) was made as described in the above Examples and sintered using conventional sintering processes, including use of an alumina setter board to support the green tape during the sintering, to form a ceramic tape 3010. Surface defects due to adhesion and abrasion from the setter board can be seen at 100-times magnification, as shown in FIG. 15. Many of the adhesion or abrasion-caused defects form pin holes in the sintered sheet because the sheet is so thin, on the order of 25 micrometers. As shown in FIG. 15, the defects due to adhesion and abrasion from the setter board are generally oblong in a common direction to one another, As discussed above, setter-induced defects are typically surface features caused by sintering shrinkage of a green tape in contact with a setter board, where the ceramic drags portions of itself across the setter board during sintering shrinkage. The result is that the supported side of the resulting sintered article has surface defects, such as drag grooves, sintered debris, impurity patches, etc. transferred from refractory material of the setter board to the sintering article, and pits in the surface where the setters pull out material from the sintered article. Minimizing such setter defects is important when the ceramic article is has thin films deposited on it. If the layer thickness of the thin film or films is similar to a setter defect dimension, the thin film may have pin holes or have the setter defect traversing the thin film layer(s).

Figure 19:
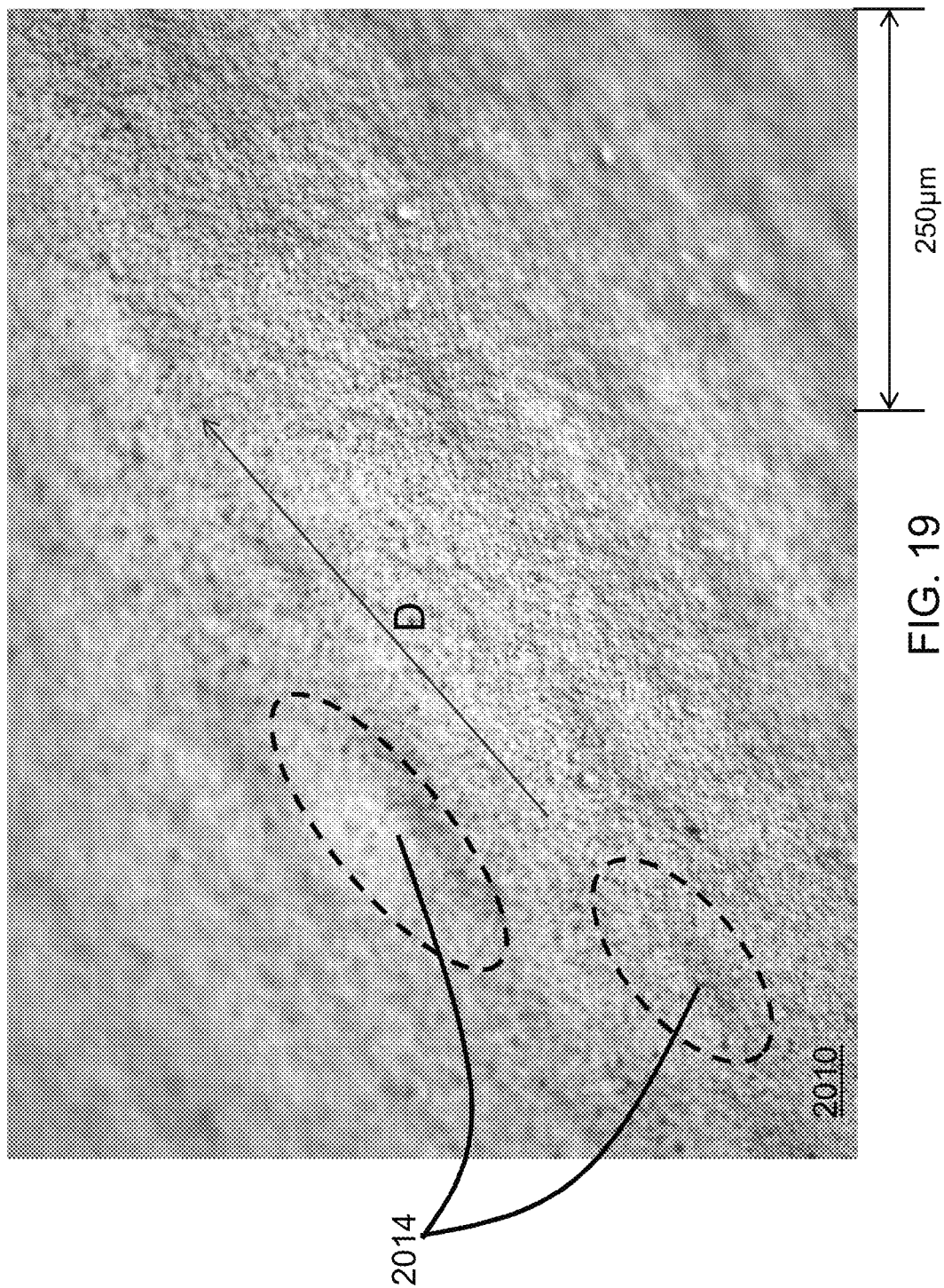
FIG. 19 is a micrograph of a thin ceramic sheet sintered using inventive processes disclosed herein at 100 times magnification.
Figure 20:
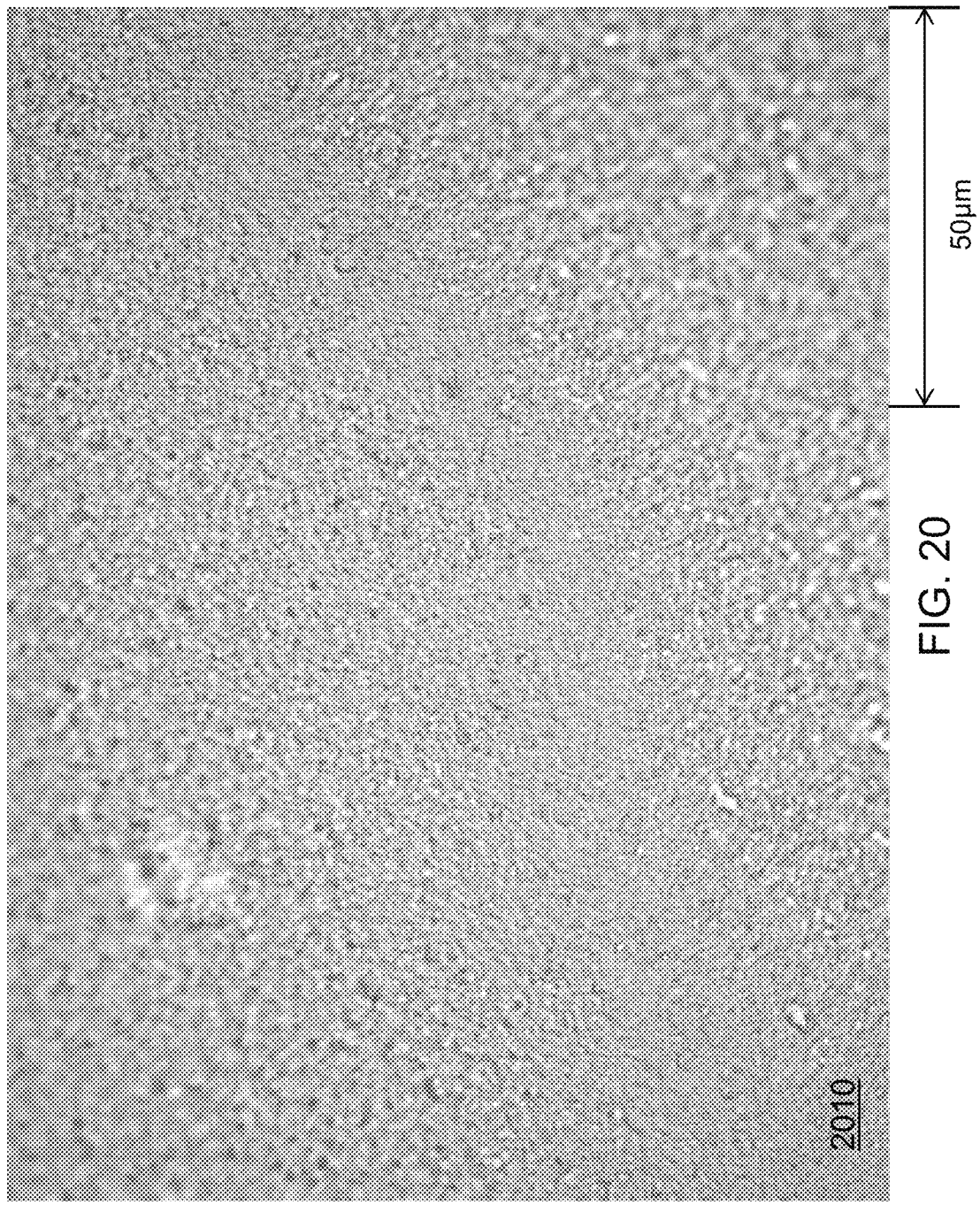
FIG. 20 is the same sheet as FIG. 19 at 500 times magnification.

Compare the ceramic tape 3010 of FIGS. 15-16, to the ceramic tape 2010 of FIGS. 17-22, manufactured using the technology of the present disclosure; especially as shown in FIGS. 19-20, which are at the same magnifications 100× and 500×, respectively, of FIGS. 15-16, and are from a green tape made in the same way as the tape used for FIGS. 15-16. More specifically, the ceramic tape 2010 was continuously sintered, as disclosed herein, run at 1400° C. at a rate of 2 inches per minute through a secondary furnace as described in the Examples, with a silicon carbide central channel. Comparing ceramic tape 3010 to ceramic tape 2010, both tapes show various indicia of casting at the surface, such as elongate, rolling stria and sloping (hills/valleys). The ceramic tape 3010 shows numerous setter-related defects: bonded particles, pull-out and setter-drag defects, such as where setter drag produces characteristic damage patterns in regions due to gouging of the surface as the shrinking tape drags across the setter surface, as discussed herein.

Referring to FIGS. 15-16 and FIGS. 19-20, bonded particles, larger than 5 µm in a cross-sectional dimension thereof, were easily observed at 100× in optical examination of the surfaces (see FIGS. 15 and 19). More specifically, across an area of about 8 cm², one such particle was observed on the surface of the ceramic tape 2010 sintered using the technology disclosed herein, while across an equal area of about 8 cm², eight such particles were observed on the surface of the ceramic tape 3010. Applicants believe the ceramic tape 3010 had more bound particles due to contact with the setter, while the ceramic tape 2010 had a smaller number of bound surface particles, which may have been present due to adhesion of particles in the furnace atmosphere. This small number of bound surface particles on the ceramic tape 2010 may be further reduced in future process embodiments that use filters or other processes to remove or reduce particles in the furnace atmosphere.

According to an exemplary embodiment, tape manufactured according to the present disclosure has, on average over the surface thereof, fewer than 5 bonded particles, larger than 5 µm in a cross-sectional dimension thereof, per 8 $cm^2$, such as fewer than 3 such particles, such as fewer than 2 such particles.

According to an exemplary embodiment, a sheet of sintered ceramic, as disclosed herein, has a thickness of less than 50 micrometer and fewer than 10 pin holes, having a cross-sectional area of at least a square micrometer (or fewer than 10 pin holes over the full surface, if the surface area is less than a square micrometer), per square millimeter of surface on average over the full surface, such as fewer than 5 pin holes, fewer than 2 pin holes, and even fewer than fewer than 1 pin hole per square millimeter of surface on average over the full surface.

Referring to FIGS. 19-20, the ceramic tape 19 has a granular surface with bulges 2014. The bulges have longest dimensions on the order of 100 or more micrometers. The bulges are generally oblong, such as having major axes oriented generally in the same direction as one another, such as 90% within 15-degrees of a direction D, such as within 10-degrees. The bulges may be distinguished from setter-induced surface defects, such as abrasion and adhesion, because the bulges are generally smoothly rolling and continuously curving from adjoining surface, as opposed to being defined by or including disjointed or discontinuous borders on a surface as is characteristic of an adhered particle or an abrasion caused by a setter. The bulges may be indicia of at least some processes disclosed herein, such as due to the less-constrained sintering processes. Other embodiments may not include such bulges, such as if the tape is tensioned axially and widthwise during sintering, which may be done via tensioners (e.g., rollers, treads, wheels, mechanical tensioners or other such elements).

Figure 21:
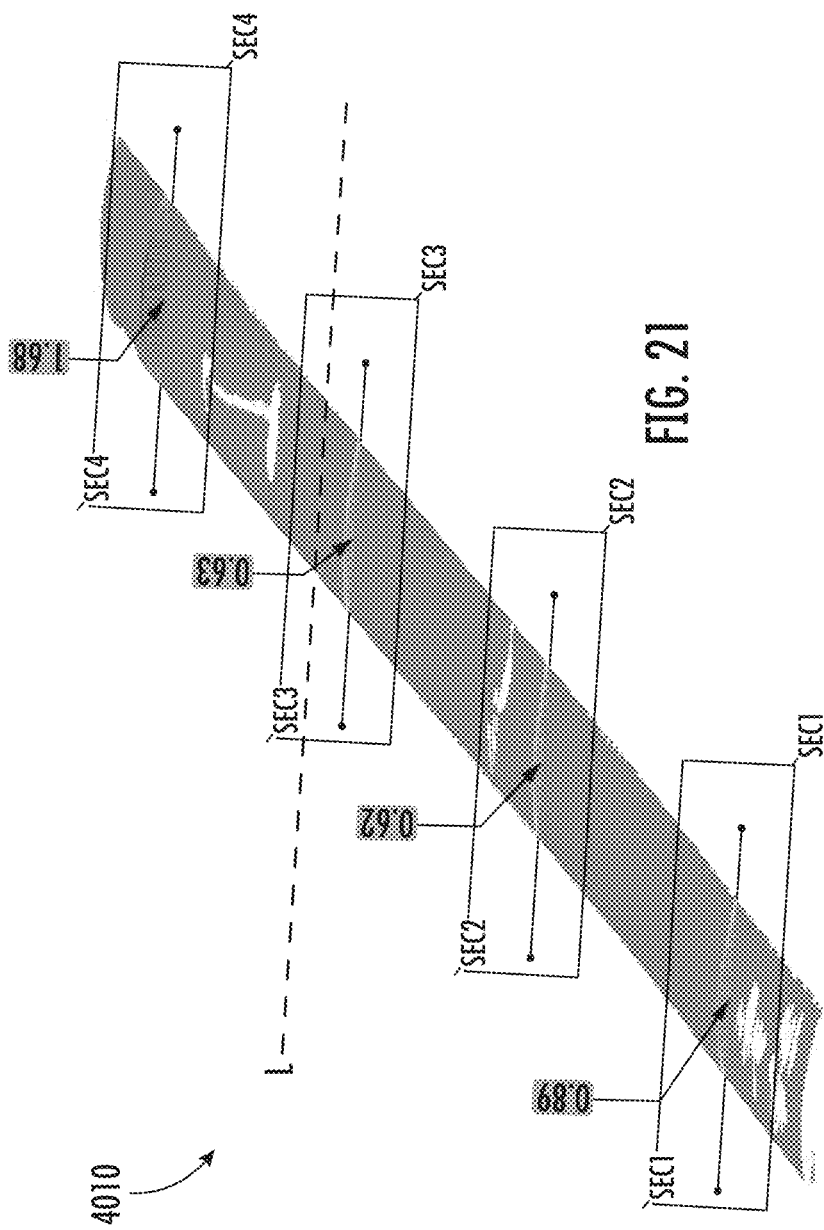
FIGS. 21-22 are surface scans of a tape according to an exemplary embodiment, with widthwise (FIG. 21) and lengthwise (FIG. 22) height profiles.
Figure 22:
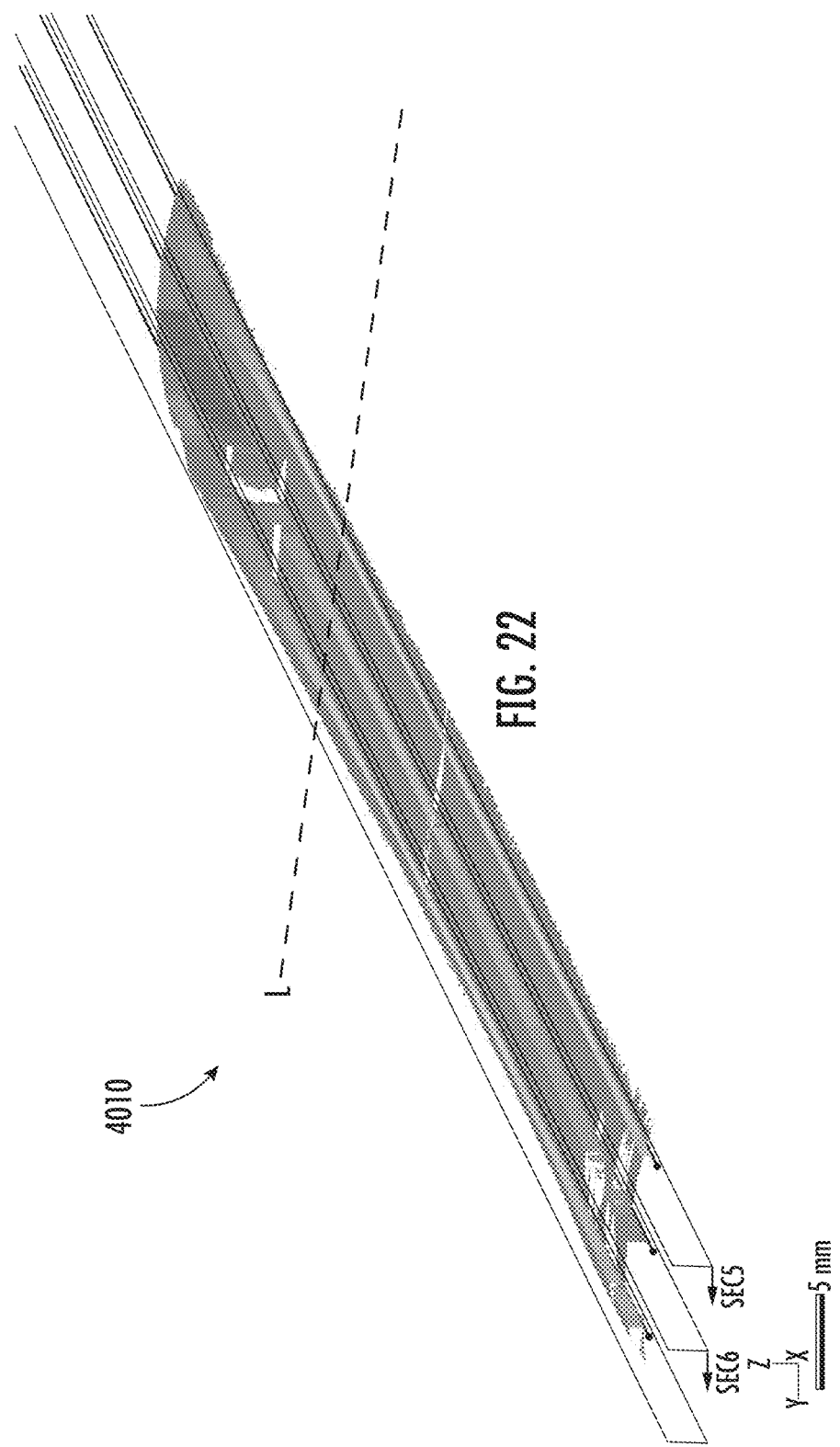

Referring now to FIGS. 21-22, a ceramic tape 4010 has been manufactured according to the processes disclosed herein, without a setter board. The material of the tape 4010 is 3 mol % yttria-stabilize zirconia, tetragonal-phase zirconia polycrystal "TZP." The width of the tape is between 12.8 to 12.9 mm. The portion shown is from a 22 inch long piece of tape. The thickness of the tape is about 22 micrometers. Incidentally, the white spots are marker markings on the tape that the scanner did not recognize.

For comparison purposes, the tape was fully sintered below the line, and only partially sintered above the dashed line L. SEC1, SEC2, SEC3, SEC4 are profiles of the top surface of the ceramic tape 4010. The profiles show that the tape has some "C-shaped" curvature about the lengthwise axis (shown as X-axis in FIG. 21). The camber in the tape is decreased by fully sintering, under tension, as disclosed herein. As can be seen, maximum height of the tape decreased by about 100% from about 1.68 mm to between 0.89 and 0.63 mm. Applicants believe that through present processes and/or further process refinements, such as increased tension or changing process speeds, that the maximum height of the fully-sintered tape resting flat on a flat surface would be less than 1.5 mm, such as less than 1 mm, such as less than 0.7 mm, such as ideally less than about 100 micrometers, such as for a tape having a width of about 10 to 15 mm.

In contemplated embodiments, the tapes described herein may be wound on a spool, as shown in the Figures, to form a roll of tape. The spool may have a diameter of at least about 0.5 cm, such as at least about 2.5 cm, and/or no greater than 1 m, with the length of the tape being at least 1 m, such as at least 10 m, and having a width and thickness as described herein, and/or such as a width of at least 10 mm and/or no greater than 20 cm and a thickness of at least 10 micrometers and/or no greater than 500 micrometers, such as no greater than 250 micrometers, such as no greater than 100 micrometers, such as no greater than 50 micrometers.

Some embodiments of the above-described technology include processes and equipment to remove binder material from a green tape, such as prior to sintering inorganic grains of the tape. Surprisingly the tape is able to endure some tensile loading following charring or removal of the binder. This finding among others disclosed herein facilitated a continuous sintering process, as described above.

Some embodiments of the above-described technology include furnaces or portions thereof specifically dedicated to binder removal. For example, as indicated above, in some embodiments the burn-off location B' of FIG. 4 may have a heat source that is separated from the sintering location C'. In other embodiments described above, the first furnace 1126 of FIG. 11 is a lower temperature furnace that chars or burns organic binder off of the tape 1112 to form an unbound section of the tape 1112. Applicants believe that actively heating a station dedicated to binder removal with its own controllable heat source, independent of heaters a sintering furnace, allows for greater control of the binder removal process, reducing likelihood of combustion of volatiles in the binder of the green tape, which is particularly beneficial for wide green tapes (e.g., at least 10 mm, at least 30 mm, at least 50 mm). Other embodiments include passively-heated binder removal stations disclosed herein, where the stations use heat emitted from an adjoining sintering furnace.

Figure 23:
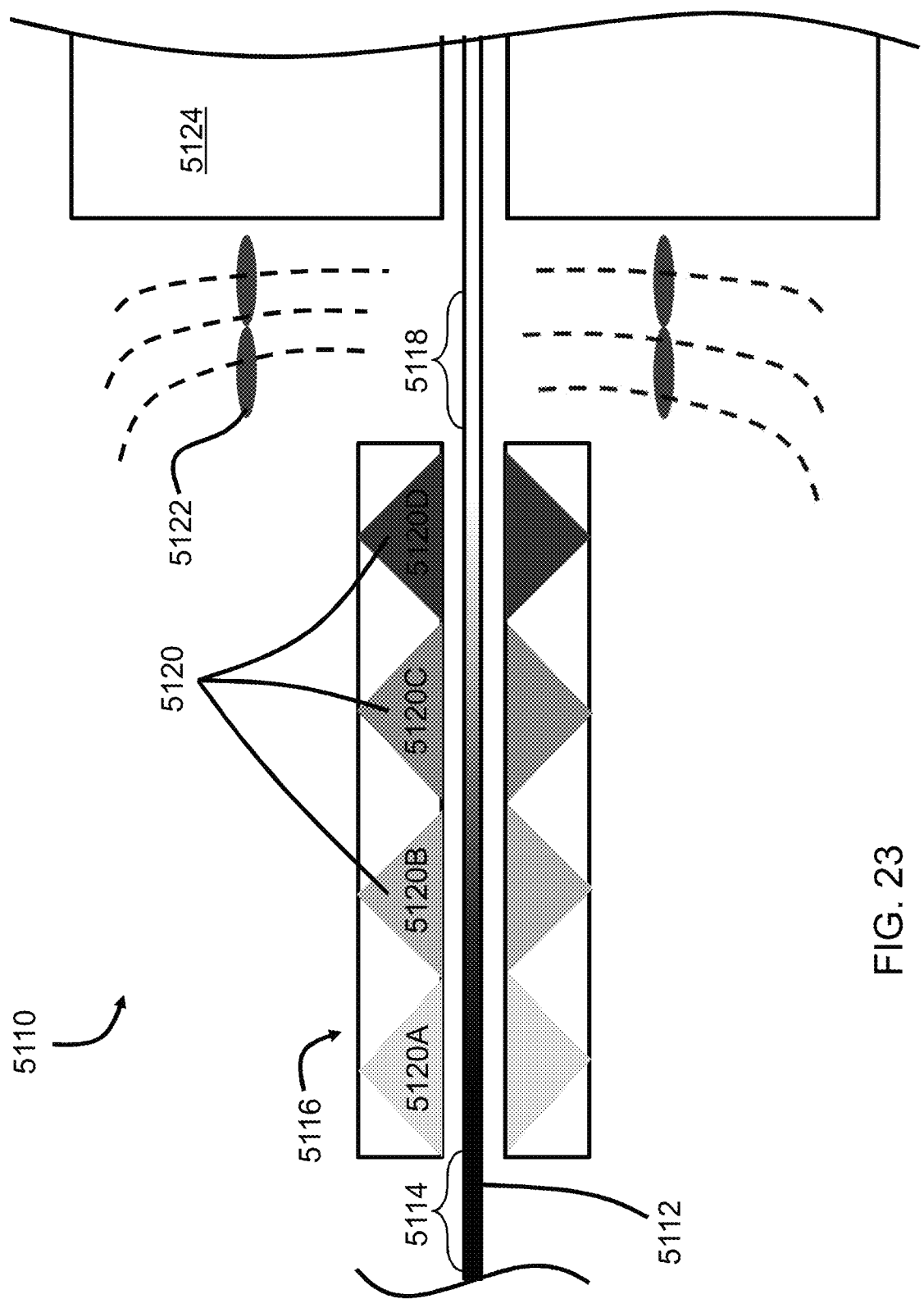
FIG. 23 is a conceptual side view of a station of a manufacturing line to prepare green tape for sintering according to an exemplary embodiment.

Referring now to FIG. 23, according to an exemplary embodiment a manufacturing system 5110 includes a tape 5112 advancing through the manufacturing system 5110. The tape 5112 includes a first portion 5114 having grains of an inorganic material bound by a binder as disclosed herein, such as an organic binder. The manufacturing system 5110 further includes a station 5116 that receives the first portion 5114 of the tape 5112 and prepares the tape 5112 for sintering by chemically changing the binder and/or removing the binder from the first portion 5114 of the tape 5112, leaving the grains of the inorganic material, to form a second portion 5118 of the tape 5112. According to an exemplary embodiment, at an instant (i.e. a single moment in time) the tape 5112 simultaneously extends toward, into, through, within, adjacent to, and/or away from the station 5116. Accordingly, at the instant the tape 5112 simultaneously includes the first portion 5114 continuously connected to the second portion 5118.

According to an exemplary embodiment, the binder of the tape 5112 may be a polymer binder and the binder is chemically changed and/or removed from the first portion 5114 of the tape 5112 by heating the binder to burn or char the binder. According to an exemplary embodiment, the station chars or burns at least most of the organic binder in terms of weight from the first portion of the tape 5112 without sintering the grains of the inorganic material, which can be measured by weighing the green tape before binder removal at the station 5116 as well as the inorganic material prior to forming the green tape, then weighing the tape 5118 following operation of the station 5116 and comparing differences. If remnants of the binder remain, such as carbon, Applicants believe that subsequent sintering, at higher temperatures, may generally remove those remnants. In other contemplated embodiments, the binder may be chemically removed, such as formed from a material selected to chemically react with a another material (e.g., catalyst, gas) delivered to the green tape at a binder removal station prior to sintering. In still other contemplated embodiments, binder may be evaporated or otherwise vaporized and outgassed from the tape 5112 at a station prior to sintering.

Still referring to FIG. 23, according to an exemplary embodiment the station 5116 comprises an active heater 5120 to char or burn at least most of the organic binder from the first portion 5114 of the tape 5112 as the tape 5112 interfaces with the station 5116 to form the second portion of the tape 5118. The active heater 5120 provides heat energy to the tape 5112 to burn out the binder. In some embodiments, the heater 5120 is or includes an electrical heating element, such as an inductive or resistive heating element. In other embodiments, the heater 5120 is or includes a combustion heating element, such as a gas heating element. In still other embodiments, the heater 5120 is or includes a microwave and/or a laser or other heating element.

According to an exemplary embodiment, the active heater 5120 of the station 5116 includes heating zones, such as zones 5120A, 5120B, 5120C, 5120D such that the rate of heat energy received by the tape 5112 increases as the tape 5112 advances through the station 5116. In some embodiments, the rate of heat energy received by the tape 5112 increases in a nonlinear manner, such as slowly increasing at first, as the binder degrades and emits combustible gaseous byproducts, and then faster as the potential for the tape 5112 catching fire is reduced. According to an exemplary embodiment, temperatures experienced by the tape 5112 in the station 5116 may be at least 200° C., such as at least 250° C., and/or below a sintering temperature for the inorganic grains carried by the tape 5112, such as less than 1200° C., such as less than 900° C.

According to an exemplary embodiment, the manufacturing system 5110 blows and/or draws gas over (e.g., over and under) the tape 5112 as the tape 5112 advances through the station 5116. In some embodiments, the heater 5120 may provide a flow of hot air to communicate the heat energy to the tape 5112, as may be delivered through an array of nozzles through a wall from a plenum, or through a porous wall material. In other embodiments, flow of the gas is facilitated by fans or pumps adjoining the station 5116, such as fan 5122. Tanks of pressurized gas may also be used as sources to supply gas to be blown over the tape. In some embodiments, the gas is air. In other embodiments, the gas is an inert gas, such as argon.

In some embodiments, gas is blown and/or drawn over both the topside and underside of the tape 5112, while in other embodiments, the gas is directed only over the topside or the underside. In some such embodiments, the tape 5112 is directly supported by a gas bearing and/or an underlying surface and moves relative to that surface. For example, the tape 5112 may slide along and contact an underlying surface, such as a surface made of stainless steel. In some embodiments the gas is heated to a temperature above room temperature before blowing or drawing it over the tape, such as to at least 100° C., which may help prevent thermal shock of the tape 5112.

Actively blowing or drawing gas over the tape 5112, especially air or gas containing oxygen, may be counterintuitive to those of skill in the art because one might expect the oxygen to fuel and promote the tape catching fire, which could distort the shape of the tape 5112 and/or otherwise harm quality of the tape 5112. However, Applicants have found that as the tape 5112 is conveyed through the manufacturing system 5110, blowing and/or drawing gas, including air in some embodiments, over the tape 5112 actually helps the tape not to catch fire. For example, Applicants have found that while the binder is removed and/or charred by the station 5116 without catching fire, the tape catches fire when moving at the same rate through the station 5110 if air is not blown over the tape 5112. Applicants contemplate that risk of catching the tape 5112 on fire may also be reduced and/or eliminated by moving the tape 5112 slower through the station 5116, further spacing apart the heat zones 5120A, 5120B, 5120C, 5120D, using flame retardants in the binder, increasing ventilation of the station 5116.

While gas may be actively blown and/or drawn over the tape 5112, Applicants have found that the second portion 5118 of the tape 5112 may be particularly susceptible to damage from vibration and/or out-of-plane bending depending upon how the gas flows. Accordingly, in some embodiments, the gas flowing through the station 5116 is and/or includes laminar flow. The flow of the air may be diffused and/or may not be directed to the second portion 5118 of the tape 5112. In some embodiments, a gas source or motivator (e.g., fan, pump, pressurized supply) delivers at least 1 liter of gas per minute through the station 5116, such as through the passage 5128 (see FIG. 24).

According to some embodiments, the tape 5112 advances horizontally, not vertically through the station 5116. Orienting the tape horizontally may help control airflow through the station 5116, such as by reducing a "chimney effect," where hot gasses rise and pull too much air through the station 5116, vibrating the second portion 5118 of the tape 5112. Air pumps, fans, and surrounding environmental air conditions (e.g., high temperatures) offset and/or control the chimney effect without horizontally orienting the tape 5112 through the station 5116 in other contemplated embodiments.

According to an exemplary embodiment, the second portion 5118 of the tape 5112 is under positive lengthwise tension as the tape 5112 advances. Tension in the tape 5112 may help hold the tape 5112 in a flat orientation, such as if the tape 5112 subsequently passes into another station of the manufacturing system for further processing, such as a sintering furnace 5124. Without the binder, the second portion 5118 of the tape 5112 may be weaker than the first portion 5114, such as having lesser ultimate tensile strength, such as half or less, such as a quarter or less. According to an exemplary embodiment, lengthwise tension in the second portion 5118 of the tape 5112 is less than 500 grams-force per $mm^2$ of cross section. Applicants believe the first portion 5114 of the tape 5112 is substantially more bendable than the second portion 5118 such that a minimum bend radius without fracture of the first portion 5114 is less than half that of the second portion 5118 (e.g., less than a quarter, less than an eighth), when measured via ASTM standards, see E290, where bend radius is the minimum inside radius the respective portions of the tape 5112 can bend about a cylinder without fracture.

In at least some embodiments, the manufacturing system 5110 further includes the sintering furnace 5124 (see also FIG. 3A furnace system 312), which at least partially sinters the inorganic material of the second portion 5118 of the tape 5112 to form a third portion of the tape (see e.g., tape 2010). Accordingly, for continuous processing, at an instant the tape 5112 includes the first portion 5114 continuously connected to the third portion by way of the second portion 5118.

In some such embodiments, the station 5110 for binder removal is close to the sintering furnace 5124 such that distance therebetween is less than 10 m, such as less than 1 m, such as less than 10 cm, such as less than 10 mm in some embodiments, thereby mitigating thermal shock of the second portion of the tape. In contemplated embodiments, the station 5110 for binder removal is in direct contact with and adjoins the sintering furnace 5124 and/or is under a common housing therewith.

Figure 24:
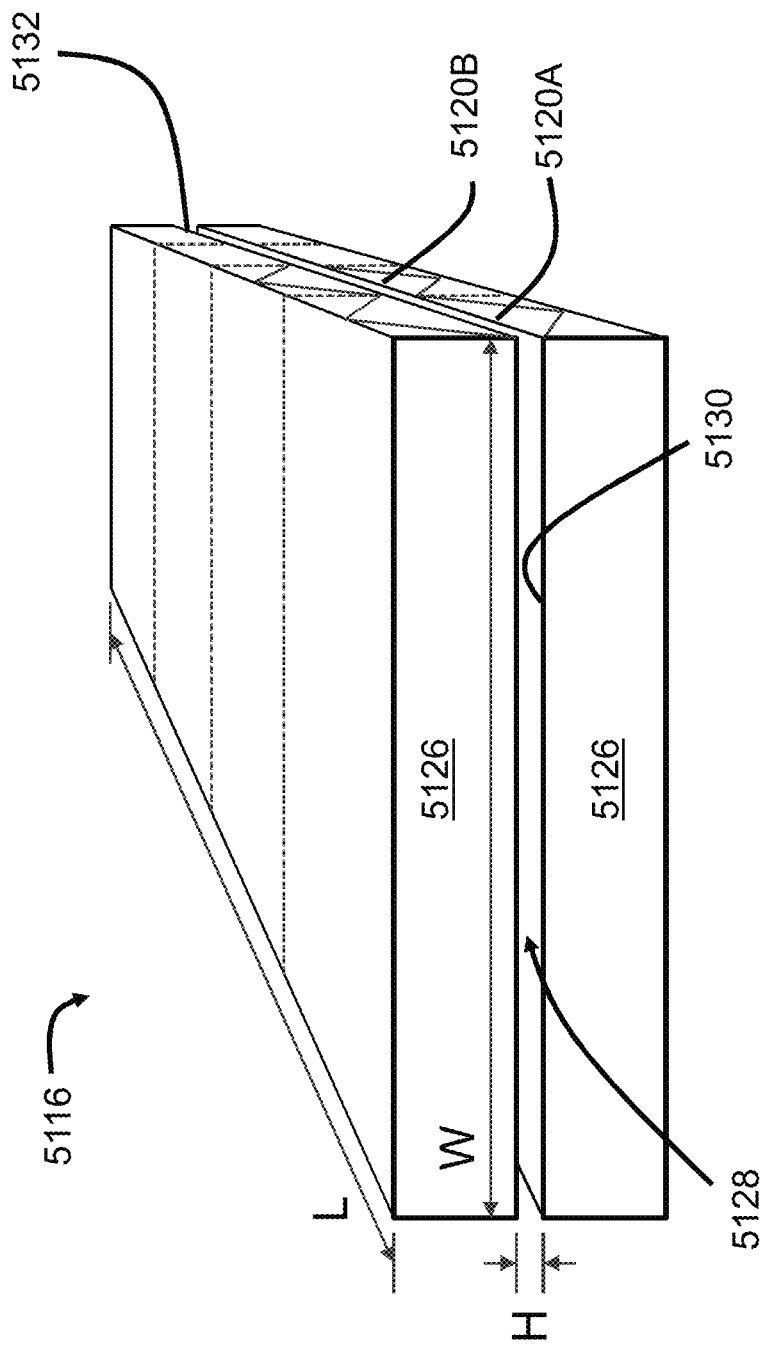
FIG. 24 is a front perspective of the station of FIG. 23.

Referring now to FIG. 24, the station 5116 includes walls 5126 defining a passage 5128 having inlet and outlet openings 5130, 5132 on opposing ends of the passage 5128. The passage has a length L between the inlet and outlet openings 5130, 5132, which in some embodiments is at least 5 cm, such as at least 10 cm, and/or no more than 10 m. According to an exemplary embodiment, the outlet opening 5132 and/or the inlet opening 5130 is narrow and elongate, such as having a height H and a width W orthogonal to the height H where the height H is less than half the width W, such as less than a fifth the width W, such as less than a tenth the width W. In some such embodiments, the height H is less than 5 cm, such as less than 2 cm, such as less than 1 cm, and/or at least greater than a thickness of green tape to be processed thereby, such as at least greater than thicknesses of green tape disclosed herein, such as at least greater than 20 μm. Applicants have found that having a narrow opening(s) improves performance of the station 5116 by limiting circulation of gas (e.g., ambient airflow) at the inlet and outlet openings 5130, 5132.

Referring to FIG. 25, a method of processing tape 5210 includes a step of advancing tape through a manufacturing system 5212 (e.g., manufacturing system 5110 or other manufacturing systems disclosed herein), such as where the tape includes a first portion having grains of an inorganic material bound by a binder. The method further includes a step of preparing the tape for sintering 5214 by forming a second portion of the tape at a station of the manufacturing system by chemically changing the binder and/or removing the binder from the first portion of the tape, leaving the grains of the inorganic material, thereby forming a second portion of the tape.

In some such embodiments, the step of preparing the tape for sintering 5214 further comprises charring or burning at least most of the binder from the first portion of the tape without contemporaneously sintering the grains of the inorganic material. In some embodiments, the station of the manufacturing system is a first station and the method of processing 5210 further comprises steps of receiving the second portion of the tape at a second station 5218, and at least partially sintering the inorganic material of the second portion of the tape 5220 at the second station to form a third portion of the tape.

In some embodiments, the method of processing 5210 further comprises positively tensioning the second portion of the tape as the tape advances 5212. In some such embodiments, positively tensioning is such that lengthwise tension in the second portion of the tape is less than 500 grams-force per mm$^2$ of cross section. In some embodiments, the method of processing 5210 further comprises blowing and/or drawing gas over the tape while preparing the tape for sintering 5214. In some embodiments, the step of advancing the tape 5212 further comprises horizontally advancing the tape through the station, and/or directly supporting the tape by a gas bearing and/or an underlying surface and moving the tape relative to that surface.

Applicants have used a binder burn-out furnace similar to station 5116 to remove binder from green tape prior to sintering. The green tape was tape cast zirconia ceramic grains loaded with polymer binder forming a ribbon of about 42 mm wide and about 25 μm thick. The green tape was feed through a horizontal six-hot-zone binder burnout furnace at 20 inches per minute. The binder burnout furnace was set at 325° C. inlet to 475° C. outlet with 0 to 25° C. increasing degree increments for the other four hot zones. About 7.5 liters per minute of air flow at temperatures 0 to 250° C. was also provided. The air flow was divided between both sides of the binder burn-out furnace. The furnace was 36 inches long and had an 18-inch hot zone.

The construction and arrangements of the manufacturing line, equipment, and resulting sintered articles, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A manufacturing system, comprising:
 a tape advancing through the manufacturing system, the tape including a first portion having grains of polycrystalline ceramic bound by an organic binder; and
 a station of the manufacturing system that receives the first portion of the tape and prepares the tape for sintering by chemically changing the organic binder and/or removing the organic binder from the first portion of the tape, leaving the grains of the polycrystalline ceramic, to form a second portion of the tape and thereby at least in part prepare the tape for sintering,
 wherein the station chars or burns at least most of the organic binder, in terms of weight, from the first portion of the tape without sintering the grains of polycrystalline ceramic, and
 wherein the station comprises an active heater that includes heating zones such that a rate of heat energy received by the tape increases as the tape advances through the station.

2. The manufacturing system of claim 1, wherein the rate of heat energy received by the tape increases in a nonlinear manner as the tape advances through the station.

3. The manufacturing system of claim 1, wherein the rate of heat energy received by the tape increases slower at first, and then faster as the tape advances through the station.

4. The manufacturing system of claim 1, wherein the first portion of the tape is substantially more bendable than the second portion such that a minimum bend radius without fracture of the first portion is less than half that of the second portion.

5. The manufacturing system of claim 1, wherein the manufacturing system blows and/or draws gas over the tape as the tape advances through the station, wherein the station heats the tape above a temperature at which the organic binder would ignite without the gas blown and/or drawn over the tape.

6. The manufacturing system of claim 1, wherein the second portion of the tape is under positive lengthwise tension as the tape advances.

7. A manufacturing system, comprising:
a tape advancing through the manufacturing system, the tape including a first portion having grains of polycrystalline ceramic bound by an organic binder; and
a station of the manufacturing system that receives the first portion of the tape and prepares the tape for sintering by chemically changing the organic binder and/or removing the organic binder from the first portion of the tape, leaving the grains of the polycrystalline ceramic, to form a second portion of the tape and thereby at least in part prepare the tape for sintering,
wherein the station chars or burns at least most of the organic binder, in terms of weight, from the first portion of the tape without sintering the grains of polycrystalline ceramic,
wherein the station comprises an active heater that includes heating zones such that a rate of heat energy received by the tape increases as the tape advances through the station,
wherein, as the tape advances through the station, the tape is directly supported by an underlying surface and moves relative to that surface.

8. The manufacturing system of claim 7, wherein the rate of heat energy received by the tape increases in a nonlinear manner as the tape advances through the station.

9. The manufacturing system of claim 7, wherein the rate of heat energy received by the tape increases slower at first, and then faster as the tape advances through the station.

10. The manufacturing system of claim 7, wherein the first portion of the tape is substantially more bendable than the second portion such that a minimum bend radius without fracture of the first portion is less than half that of the second portion.

11. The manufacturing system of claim 7, wherein the manufacturing system blows and/or draws gas over the tape as the tape advances through the station, wherein the station heats the tape above a temperature at which the organic binder would ignite without the gas blown and/or drawn over the tape.

12. The manufacturing system of claim 7, wherein the second portion of the tape is under positive lengthwise tension as the tape advances.

13. A manufacturing system, comprising:
a tape advancing through the manufacturing system, the tape including a first portion having grains of polycrystalline ceramic bound by an organic binder; and
a station of the manufacturing system that receives the first portion of the tape and prepares the tape for sintering by chemically changing the organic binder and/or removing the organic binder from the first portion of the tape, leaving the grains of the polycrystalline ceramic, to form a second portion of the tape and thereby at least in part prepare the tape for sintering,
wherein the station comprises an active heater that includes heating zones such that a rate of heat energy received by the tape increases as the tape advances through the station,
wherein the tape advances horizontally through the station, and wherein, as the tape advances through the station, the tape is directly supported by a gas bearing and/or an underlying surface and moves relative to that surface.

14. The manufacturing system of claim 13, wherein the rate of heat energy received by the tape increases in a nonlinear manner as the tape advances through the station.

15. The manufacturing system of claim 13, wherein the rate of heat energy received by the tape increases slower at first, and then faster as the tape advances through the station.

16. The manufacturing system of claim 13, wherein the first portion of the tape is substantially more bendable than the second portion such that a minimum bend radius without fracture of the first portion is less than half that of the second portion.

17. The manufacturing system of claim 13, wherein the manufacturing system blows and/or draws gas over the tape as the tape advances through the station, wherein the station heats the tape above a temperature at which the organic binder would ignite without the gas blown and/or drawn over the tape.

18. The manufacturing system of claim 13, wherein the second portion of the tape is under positive lengthwise tension as the tape advances.

19. A manufacturing system, comprising:
a tape advancing through the manufacturing system, the tape including a first portion having grains of polycrystalline ceramic bound by an organic binder; and
a station of the manufacturing system that receives the first portion of the tape and prepares the tape for sintering by chemically changing the organic binder and/or removing the organic binder from the first portion of the tape, leaving the grains of the polycrystalline ceramic, to form a second portion of the tape and thereby at least in part prepare the tape for sintering,
wherein the station chars or burns at least most of the organic binder, in terms of weight, from the first portion of the tape without sintering the grains of polycrystalline ceramic,
wherein the station is arranged such that a rate of heat energy received by the tape increases as the tape advances through the station,
wherein, as the tape advances through the station, the tape is directly supported by an underlying surface and moves relative to that surface.

20. The manufacturing system of claim 19, wherein the rate of heat energy received by the tape increases in a nonlinear manner as the tape advances through the station.

21. The manufacturing system of claim 19, wherein the rate of heat energy received by the tape increases slower at first, and then faster as the tape advances through the station.

22. The manufacturing system of claim 19, wherein the first portion of the tape is substantially more bendable than the second portion such that a minimum bend radius without fracture of the first portion is less than half that of the second portion.

23. The manufacturing system of claim 19, wherein the manufacturing system blows and/or draws gas over the tape as the tape advances through the station, wherein the station heats the tape above a temperature at which the organic binder would ignite without the gas blown and/or drawn over the tape.

24. The manufacturing system of claim 19, wherein the second portion of the tape is under positive lengthwise tension as the tape advances.

25. A manufacturing system, comprising:
- a tape advancing through the manufacturing system, the tape including a first portion having grains of polycrystalline ceramic bound by an organic binder; and
- a station of the manufacturing system that receives the first portion of the tape and prepares the tape for sintering by chemically changing the organic binder and/or removing the organic binder from the first portion of the tape, leaving the grains of the polycrystalline ceramic, to form a second portion of the tape and thereby at least in part prepare the tape for sintering,
- wherein the station comprises an active heater that includes heating zones such that a rate of heat energy received by the tape increases as the tape advances through the station, and
- wherein the rate of heat energy received by the tape increases in a nonlinear manner as the tape advances through the station.

26. The manufacturing system of claim 25, wherein the rate of heat energy received by the tape increases slower at first, and then faster as the tape advances through the station.

27. The manufacturing system of claim 25, wherein the first portion of the tape is substantially more bendable than the second portion such that a minimum bend radius without fracture of the first portion is less than half that of the second portion.

28. The manufacturing system of claim 25, wherein the manufacturing system blows and/or draws gas over the tape as the tape advances through the station, wherein the station heats the tape above a temperature at which the organic binder would ignite without the gas blown and/or drawn over the tape.

29. The manufacturing system of claim 25, wherein the second portion of the tape is under positive lengthwise tension as the tape advances.

30. A manufacturing system, comprising:
- a tape advancing through the manufacturing system, the tape including a first portion having grains of polycrystalline ceramic bound by an organic binder; and
- a station of the manufacturing system that receives the first portion of the tape and prepares the tape for sintering by chemically changing the organic binder and/or removing the organic binder from the first portion of the tape, leaving the grains of the polycrystalline ceramic, to form a second portion of the tape and thereby at least in part prepare the tape for sintering,
- wherein the station chars or burns at least most of the organic binder, in terms of weight, from the first portion of the tape without sintering the grains of polycrystalline ceramic, and
- wherein the station is arranged such that a rate of heat energy received by the tape increases as the tape advances through the station.

31. The manufacturing system of claim 30, wherein the rate of heat energy received by the tape increases in a nonlinear manner as the tape advances through the station.

32. The manufacturing system of claim 30, wherein the rate of heat energy received by the tape increases slower at first, and then faster as the tape advances through the station.

33. The manufacturing system of claim 30, wherein the first portion of the tape is substantially more bendable than the second portion such that a minimum bend radius without fracture of the first portion is less than half that of the second portion.

34. The manufacturing system of claim 30, wherein the manufacturing system blows and/or draws gas over the tape as the tape advances through the station, wherein the station heats the tape above a temperature at which the organic binder would ignite without the gas blown and/or drawn over the tape.

35. The manufacturing system of claim 30, wherein the second portion of the tape is under positive lengthwise tension as the tape advances.

* * * * *

UNITED STATES PATENT AND TRADEMARK OFFICE
CERTIFICATE OF CORRECTION

| | |
|---|---|
| PATENT NO. | : 11,577,427 B2 |
| APPLICATION NO. | : 17/738072 |
| DATED | : February 14, 2023 |
| INVENTOR(S) | : Michael Edward Badding et al. |

It is certified that error appears in the above-identified patent and that said Letters Patent is hereby corrected as shown below:

On the Title Page

On page 3, in Column 1, under "Other Publications", Line 26, delete "Y203" and insert -- Y2O3 --.

Signed and Sealed this
Twenty-fifth Day of June, 2024

Katherine Kelly Vidal
*Director of the United States Patent and Trademark Office*